US010527007B2

(12) United States Patent
Russell

(10) Patent No.: US 10,527,007 B2
(45) Date of Patent: Jan. 7, 2020

(54) INTERNAL COMBUSTION ENGINE/GENERATOR WITH PRESSURE BOOST

(71) Applicant: RUSSELL ENERGY CORPORATION, Frankfort, IL (US)

(72) Inventor: Robert L. Russell, Frankfort, IL (US)

(73) Assignee: RUSSEL ENERGY CORPORATION, Valparaiso, IN (US)

( * ) Notice: Subject to any disclaimer, the term of this patent is extended or adjusted under 35 U.S.C. 154(b) by 232 days.

(21) Appl. No.: 14/754,060

(22) Filed: Jun. 29, 2015

(65) Prior Publication Data

US 2016/0377030 A1     Dec. 29, 2016

(51) Int. Cl.
| F02M 25/03 | (2006.01) |
| F01N 3/08 | (2006.01) |
| F02B 1/06 | (2006.01) |
| F02B 1/14 | (2006.01) |

(52) U.S. Cl.
CPC ........... *F02M 25/03* (2013.01); *F01N 3/0842* (2013.01); *F02B 1/06* (2013.01); *F02B 1/14* (2013.01); *F01N 2570/14* (2013.01)

(58) Field of Classification Search
CPC ....... F02M 25/03; F01B 1/0624; F02B 47/02; F02B 2275/36
USPC ...................................................... 123/25 C
See application file for complete search history.

(56) References Cited

U.S. PATENT DOCUMENTS

| 683,834 A | 10/1901 | Beckfield |
| 696,251 A | 3/1902 | McFarland, Jr. |
| 713,147 A | 11/1902 | Power |
| 760,318 A | 5/1904 | Dickson et al. |
| 769,363 A | 9/1904 | Toliver |
| 866,002 A | 9/1907 | Daellenbach |
| 904,219 A | 11/1908 | Patrick |

(Continued)

FOREIGN PATENT DOCUMENTS

| AU | 2001246251 B2 | 10/2001 |
| CH | 562391 A5 | 5/1975 |

(Continued)

OTHER PUBLICATIONS

International Search Report and Written Opinion both dated Oct. 13, 2016; PCT/US2016/033701.

(Continued)

*Primary Examiner* — Stephen K Cronin
*Assistant Examiner* — Omar Morales

(57) ABSTRACT

This invention relates to improvements in internal combustion engines. More particularly it relates to increased levels of usable electrical energy production and fuel efficiency within a relatively fixed speed, cam-track style Engine/Generator when combined with the secondary injection or injections of a rapidly expanding medium (usually water) into the engines combustion chambers during and after the combustion process has been initiated. The injection of said medium causing reduced fuel consumption, increased cylinder pressure, an extended usable piston stroke length, and increased usable energy production, while reducing the temperature of the combustion gases in order to control or eliminate the production of the pollutant, NOx and to further reduce thermal pollution exhausted into the atmosphere.

16 Claims, 19 Drawing Sheets

(56) References Cited

U.S. PATENT DOCUMENTS

| | | |
|---|---|---|
| 936,036 A | 10/1909 | Reimers |
| 951,388 A | 3/1910 | Conill |
| 986,021 A | 3/1911 | Moore |
| 1,034,708 A | 8/1912 | Henry |
| 1,077,795 A | 11/1913 | Bruns |
| 1,087,240 A | 2/1914 | Kellington |
| 1,122,972 A | 12/1914 | Maye |
| 1,218,010 A | 3/1917 | Soss |
| 1,252,757 A | 1/1918 | Williams |
| 1,282,824 A | 10/1918 | Hartson |
| 1,324,408 A | 12/1919 | Ragot |
| 1,331,826 A | 2/1920 | Shepherd |
| 1,456,479 A | 5/1923 | Atkinson et al. |
| 1,457,957 A | 6/1923 | Birkigt |
| 1,473,711 A | 11/1923 | Sherbondy |
| 1,476,264 A | 12/1923 | Matthews |
| 1,485,988 A | 3/1924 | Michel |
| 1,527,598 A | 2/1925 | Magann |
| 1,530,372 A | 3/1925 | Kastner |
| 1,533,514 A | 4/1925 | Ragot |
| 1,664,375 A | 3/1928 | Howard |
| 1,665,468 A | 4/1928 | Murray, Jr. |
| 1,700,554 A | 1/1929 | Wagner |
| 1,752,790 A | 4/1930 | Estep |
| 1,774,928 A | 9/1930 | Land |
| 1,815,134 A | 7/1931 | Weiner et al. |
| 1,825,769 A | 10/1931 | Barbarou |
| 1,832,282 A | 11/1931 | Deeble |
| 1,862,283 A | 6/1932 | Schoetzow |
| 1,889,641 A | 11/1932 | Dainton |
| 1,890,914 A | 12/1932 | Parsons, Sr. |
| 1,969,954 A | 8/1934 | Taylor |
| 2,014,672 A | 9/1935 | Schmaljohann |
| 2,073,985 A | 3/1937 | Collins |
| 2,250,793 A | 7/1941 | Feick |
| 2,253,203 A | 8/1941 | Di Lucci |
| 2,253,204 A | 8/1941 | Di Lucci |
| 2,354,988 A | 8/1944 | Fix |
| 2,371,005 A | 3/1945 | Wagers |
| 2,482,531 A * | 9/1949 | Young .................... F02M 25/10 123/575 |
| 2,558,349 A | 6/1951 | Fette |
| 2,647,501 A | 8/1953 | Rich |
| 2,667,155 A | 1/1954 | Paluch et al. |
| 2,706,470 A | 4/1955 | Sills |
| 2,827,032 A | 3/1958 | Wiknich |
| 2,920,611 A | 1/1960 | Casini |
| 2,988,065 A | 6/1961 | Wankel et al. |
| 3,069,209 A | 12/1962 | Bauer |
| 3,447,524 A | 6/1969 | Pfleghaar |
| 3,479,007 A | 11/1969 | Buell |
| 3,522,796 A | 8/1970 | Mercer, Jr. |
| 3,542,000 A | 11/1970 | Ellingsen |
| 3,673,991 A | 7/1972 | Winn |
| 3,762,377 A | 10/1973 | Anthony et al. |
| 3,874,348 A | 4/1975 | Townsend |
| 3,893,430 A | 7/1975 | Burley |
| 3,942,488 A | 3/1976 | Phillips et al. |
| 3,952,708 A | 4/1976 | Burley |
| 3,964,450 A | 6/1976 | Lockshaw |
| 3,987,758 A | 10/1976 | Wankel |
| 4,072,132 A | 2/1978 | Lindros |
| 4,095,564 A | 6/1978 | Hochstein |
| 4,144,866 A * | 3/1979 | Hakner ..................... F01C 1/44 123/216 |
| 4,149,498 A | 4/1979 | Ferrell |
| 4,334,506 A | 6/1982 | Albert |
| 4,387,672 A | 6/1983 | Crocker |
| 4,530,316 A | 7/1985 | Morrison |
| 4,548,171 A | 10/1985 | Larson |
| 4,653,438 A | 3/1987 | Russell |
| 5,012,772 A | 5/1991 | Nakamura |
| 5,125,366 A | 6/1992 | Hobbs |
| 5,146,880 A | 9/1992 | Mayne |
| 5,303,682 A | 4/1994 | Donahue et al. |
| 5,329,768 A | 7/1994 | Moscrip |
| 5,357,914 A | 10/1994 | Huff |
| 5,636,599 A | 6/1997 | Russell |
| 5,701,930 A | 12/1997 | Russell |
| 6,167,850 B1 | 1/2001 | Blount |
| 6,230,670 B1 | 5/2001 | Russell |
| 6,240,884 B1 | 6/2001 | Lillbacka |
| 6,457,443 B1 | 10/2002 | Lillbacka |
| 6,539,913 B1 | 4/2003 | Gardiner |
| 6,606,973 B2 | 8/2003 | Moe |
| 6,883,473 B2 | 4/2005 | Wondergem |
| 7,073,477 B2 | 7/2006 | Gorski |
| 7,216,607 B2 | 5/2007 | Mezheritsky et al. |
| 7,281,513 B1 | 10/2007 | Webb |
| 7,331,315 B2 | 2/2008 | Mavinahally |
| 7,367,306 B1 | 5/2008 | Holden |
| 7,451,726 B1 | 11/2008 | Sporea |
| 7,513,222 B2 | 4/2009 | Orlosky |
| 7,707,987 B2 | 5/2010 | Guthrie |
| 7,984,702 B2 | 7/2011 | Russell |
| 8,113,165 B2 | 2/2012 | Russell |
| 2002/0023597 A1 | 2/2002 | Lillbacka |
| 2004/0221823 A1 | 11/2004 | Warren |
| 2006/0243230 A1 | 11/2006 | Mavinahally et al. |
| 2006/0250043 A1 | 11/2006 | Chung |
| 2007/0022977 A1 | 2/2007 | Crower |
| 2008/0127931 A1 * | 6/2008 | Kuo .................... F02B 1/12 123/25 C |
| 2009/0250020 A1 | 10/2009 | McKaig et al. |
| 2009/0314238 A1 | 12/2009 | Russell |
| 2010/0077986 A1 | 4/2010 | Chen |
| 2013/0055984 A1 * | 3/2013 | Snell .................... F02B 43/10 123/25 R |

FOREIGN PATENT DOCUMENTS

| | | |
|---|---|---|
| DE | 372808 | 4/1923 |
| DE | 1809564 A1 | 7/1970 |
| DE | 10126176 A1 | 12/2002 |
| DE | 102011084891 A1 | 4/2012 |
| FR | 436702 | 11/1911 |
| GB | 2376719 A | 12/2002 |
| NL | 7415906 A | 6/1976 |
| WO | 98/03779 A2 | 1/1998 |
| WO | 02/079625 A1 | 10/2002 |
| WO | 2010/012731 A2 | 2/2010 |
| WO | 2016/137607 A1 | 9/2016 |

OTHER PUBLICATIONS

USPTO NFOA dated Dec. 21, 2010 in connection with U.S. Appl. No. 12/142,999.

USPTO NOA dated May 3, 2011 in connection with U.S. Appl. No. 12/142,999.

USPTO NOA dated Dec. 9, 2011 in connection with U.S. Appl. No. 12/371,677.

* cited by examiner

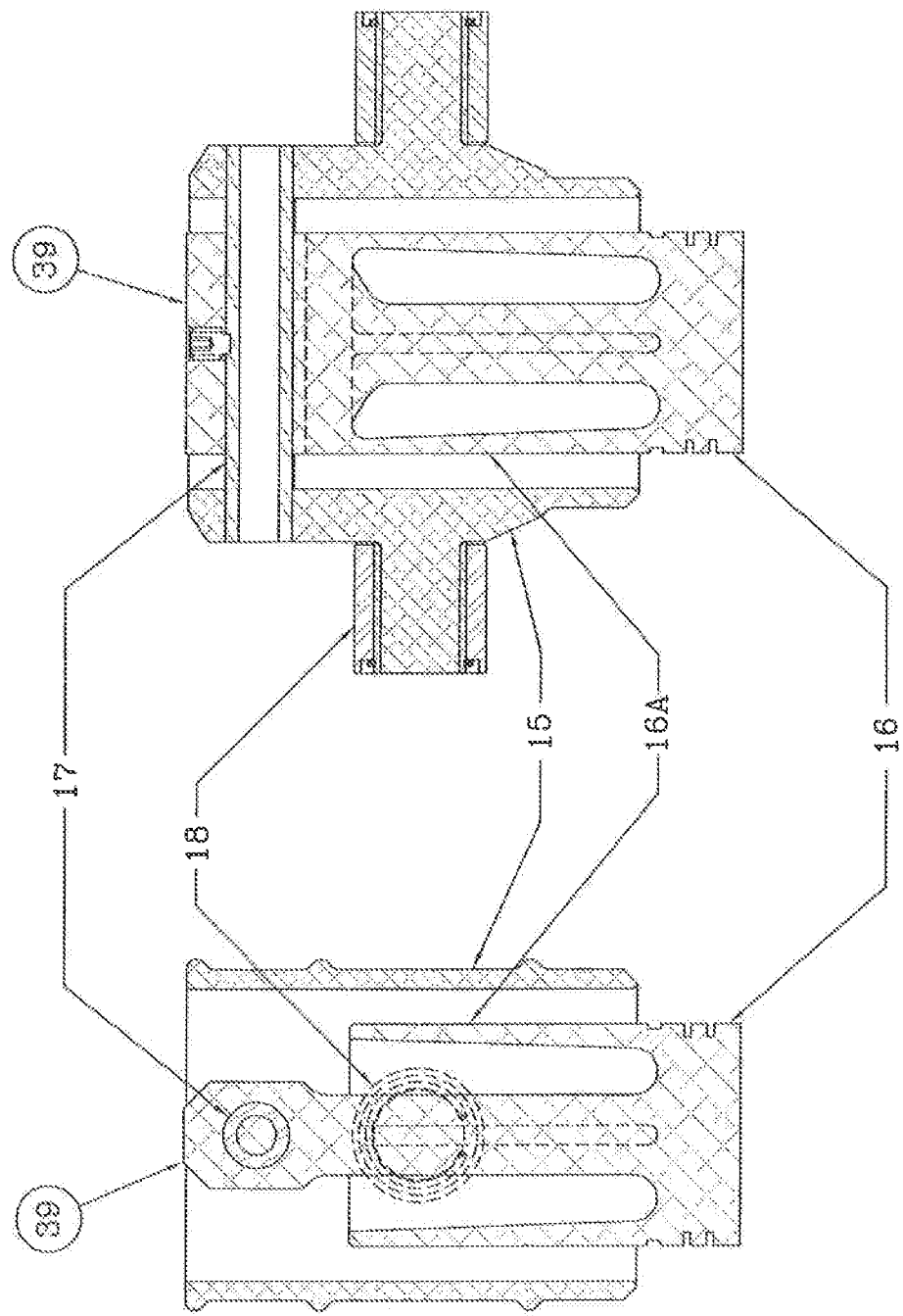

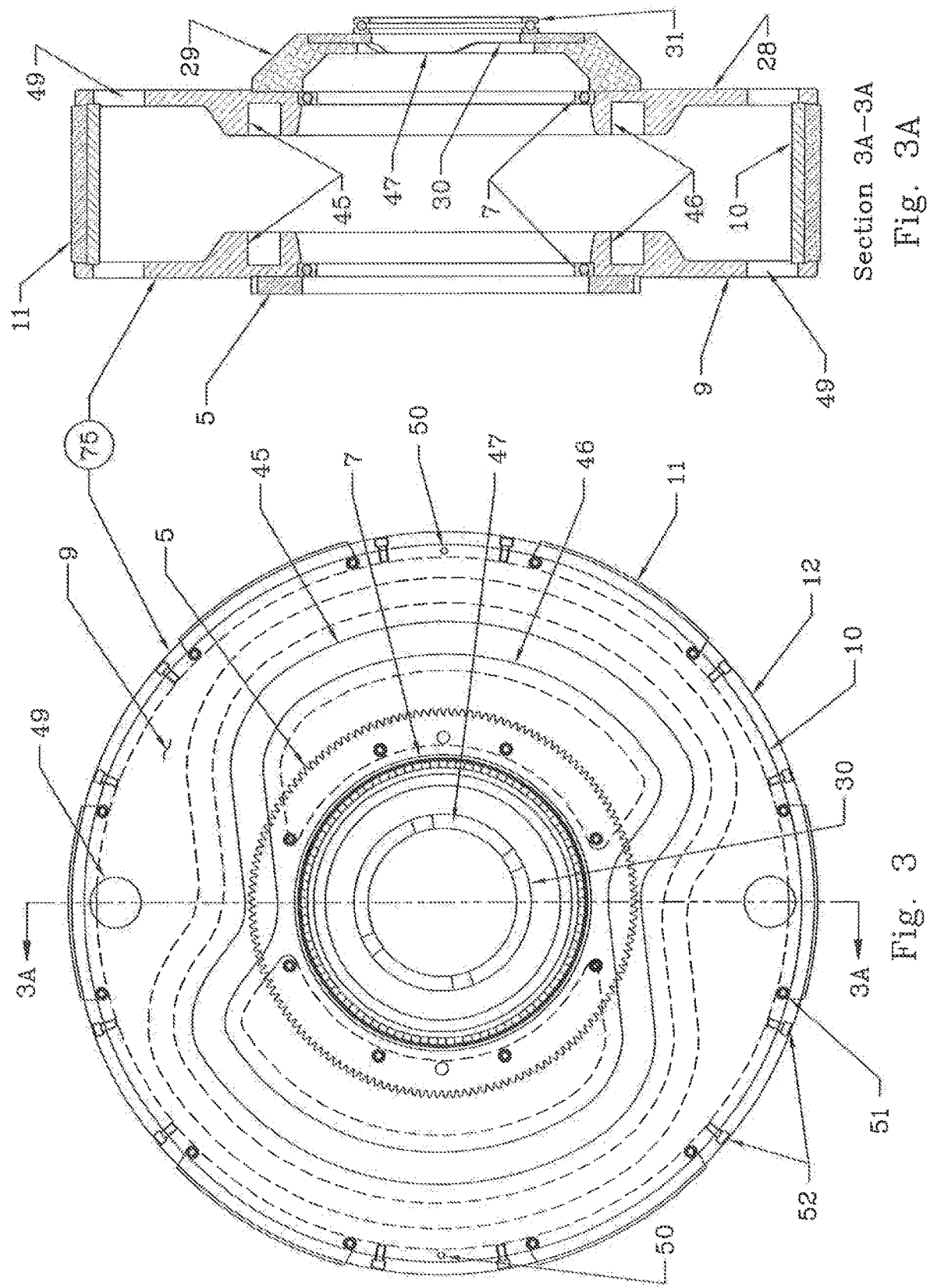

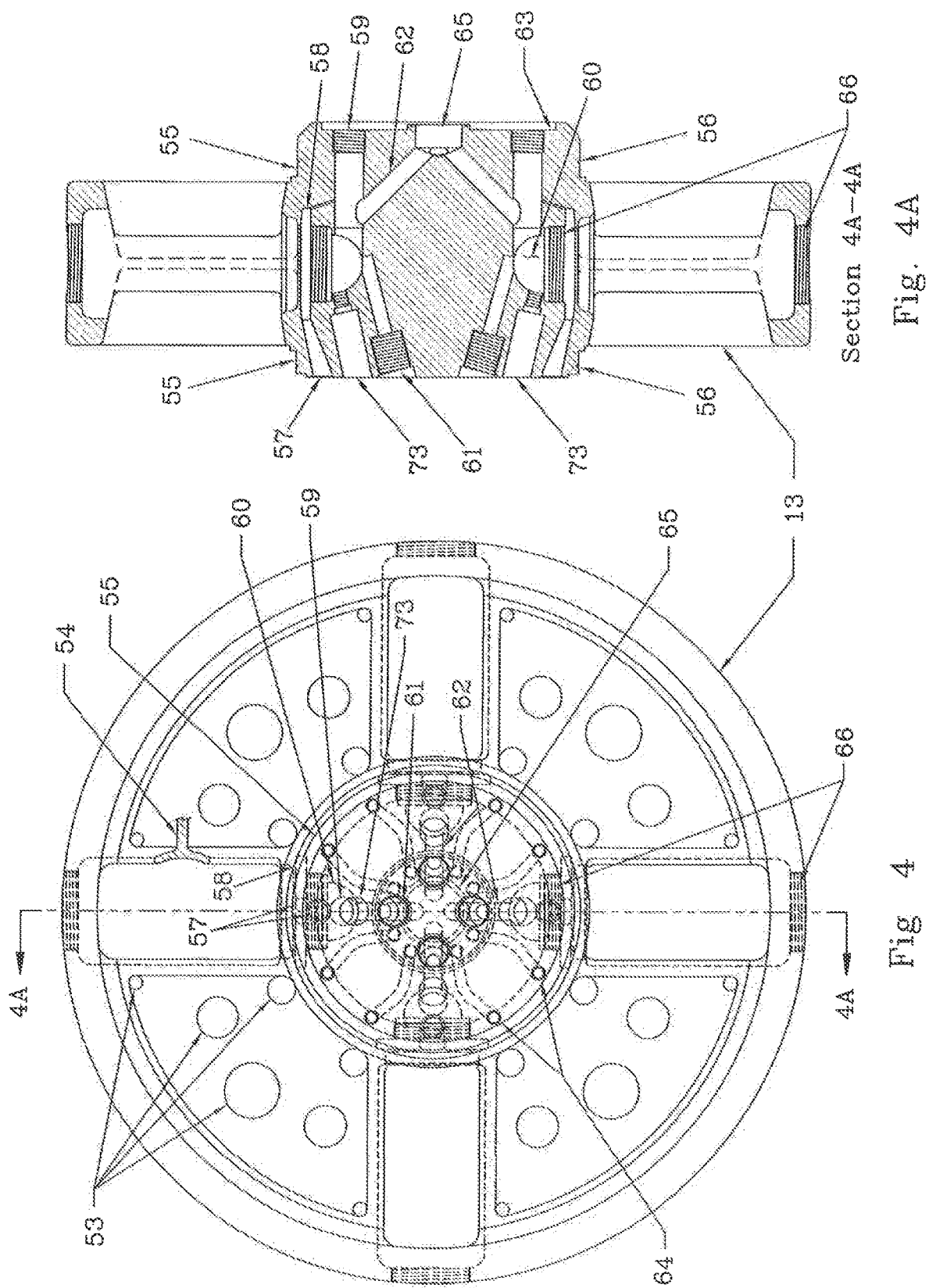

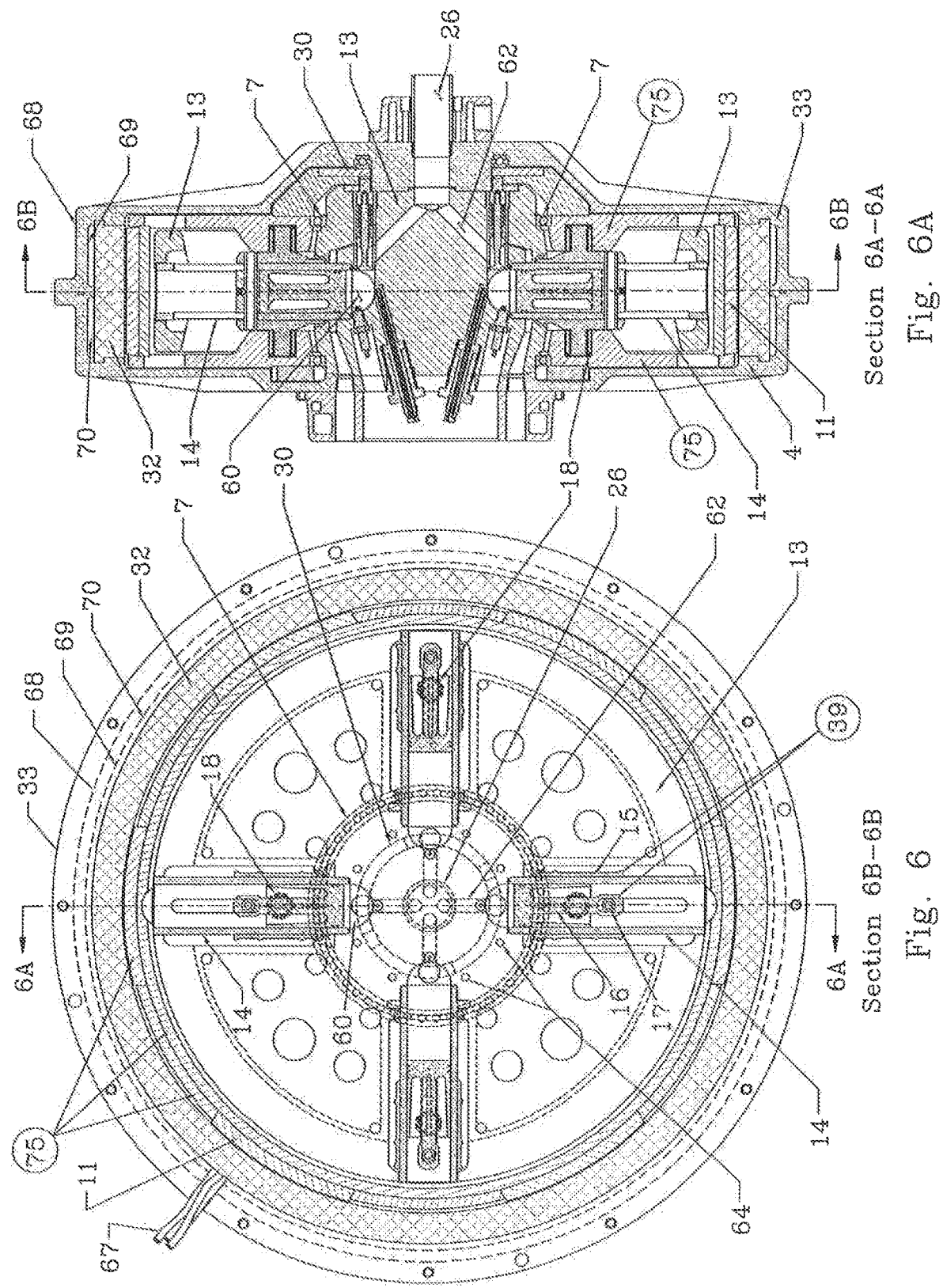

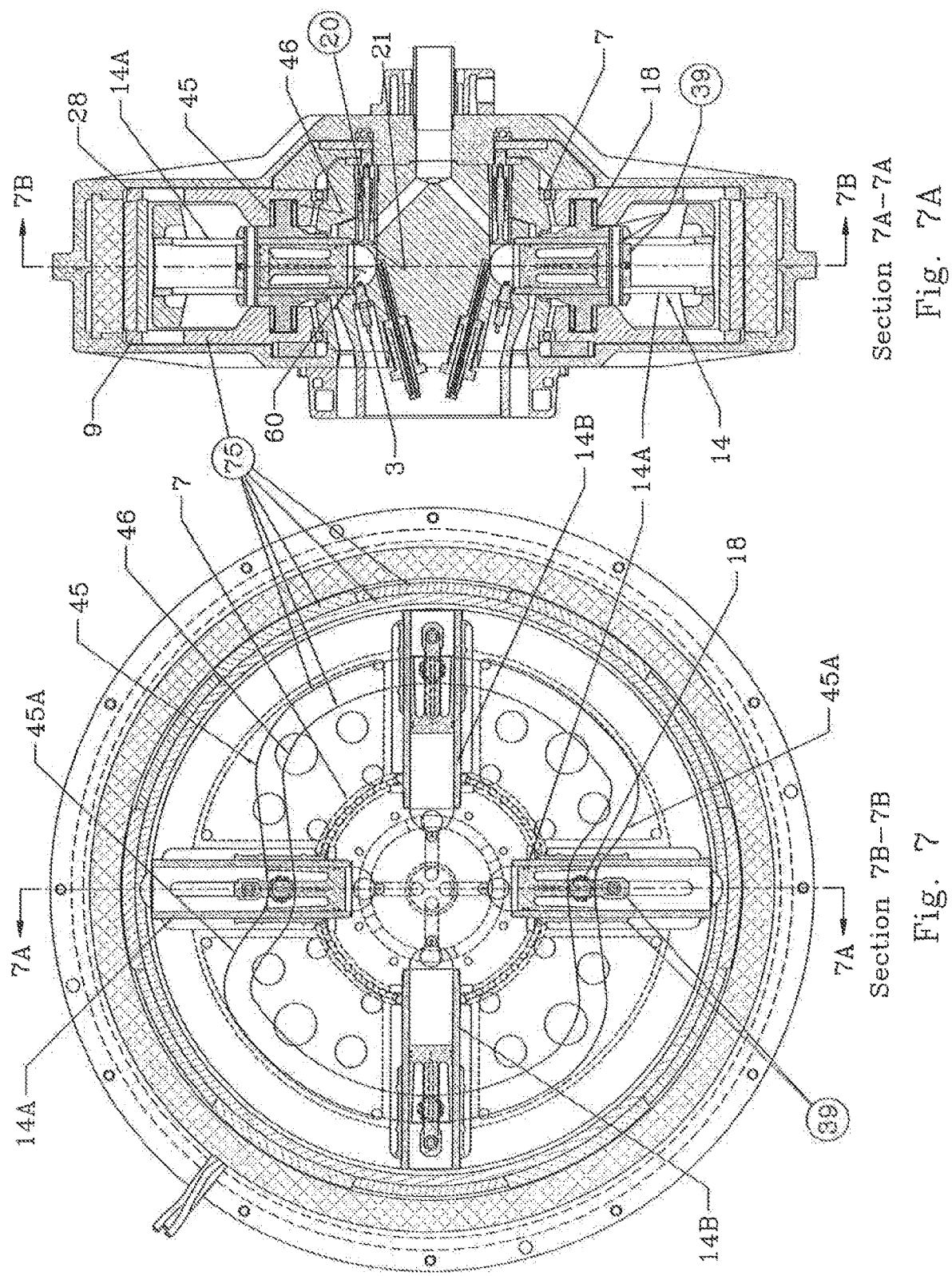

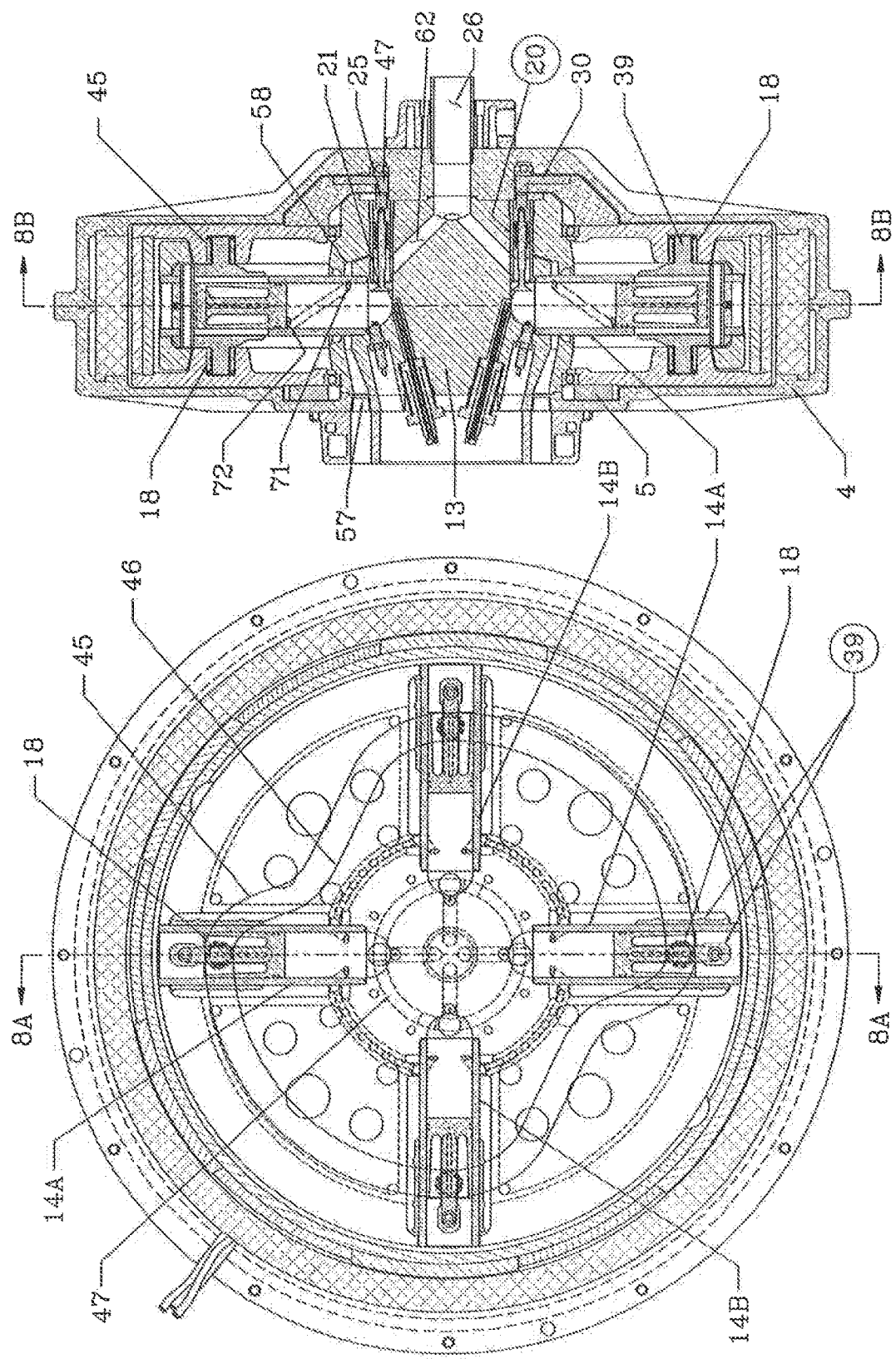

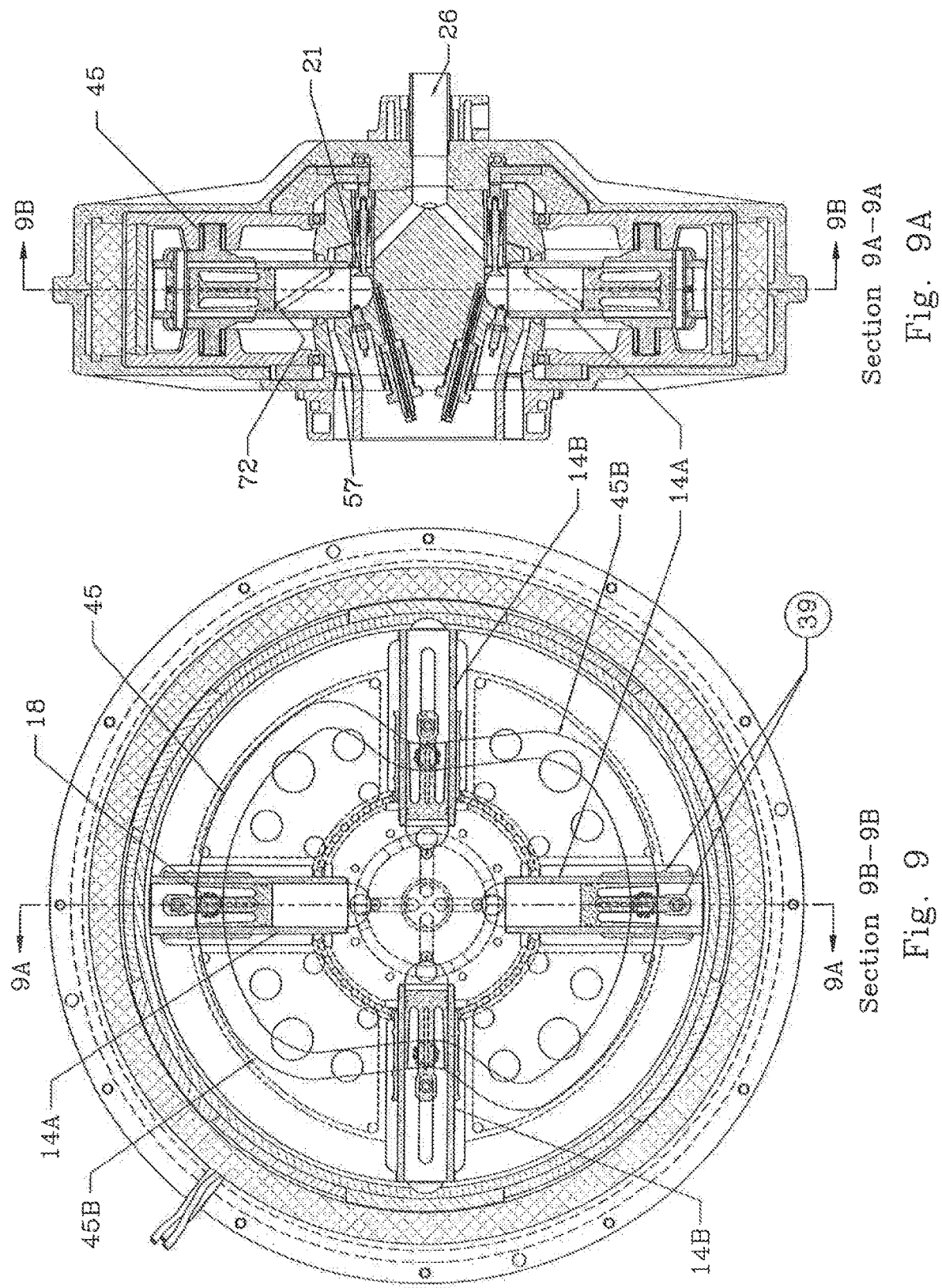

Section View – Position A

Section 10A

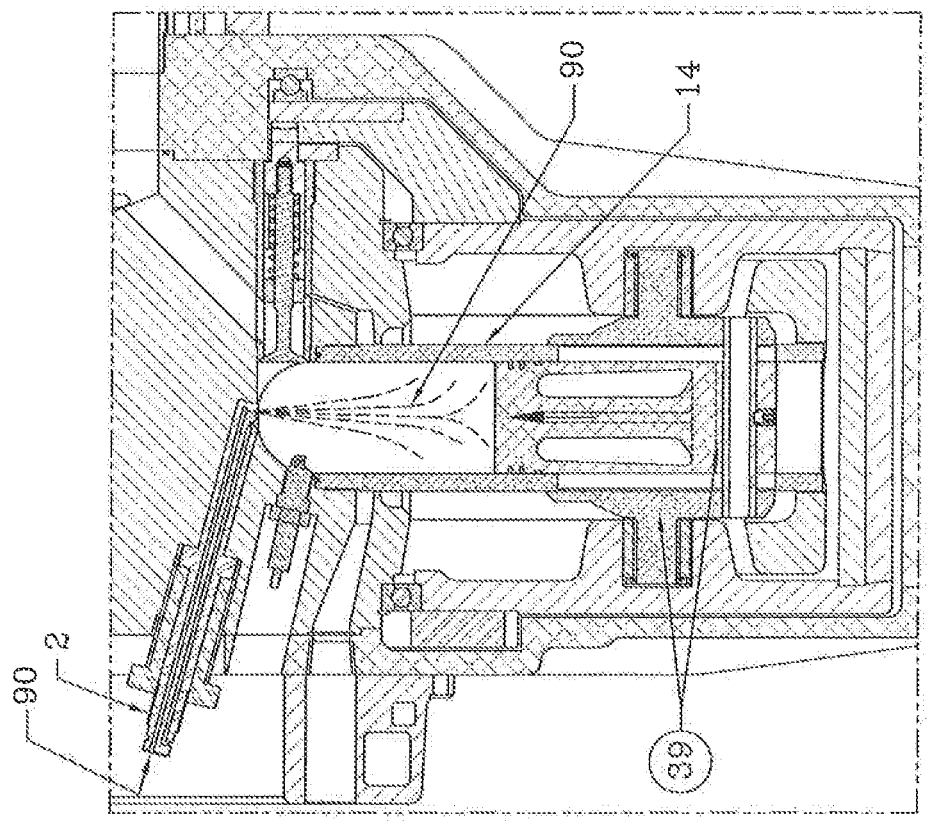
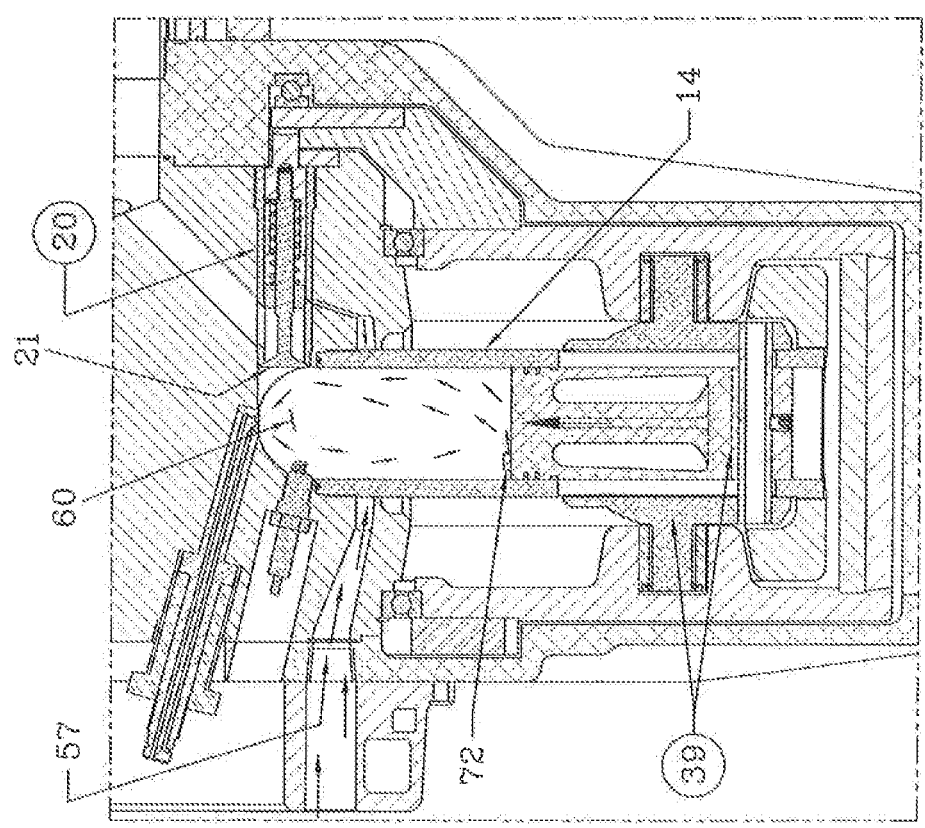

Section View – Position E

Section View – Position D

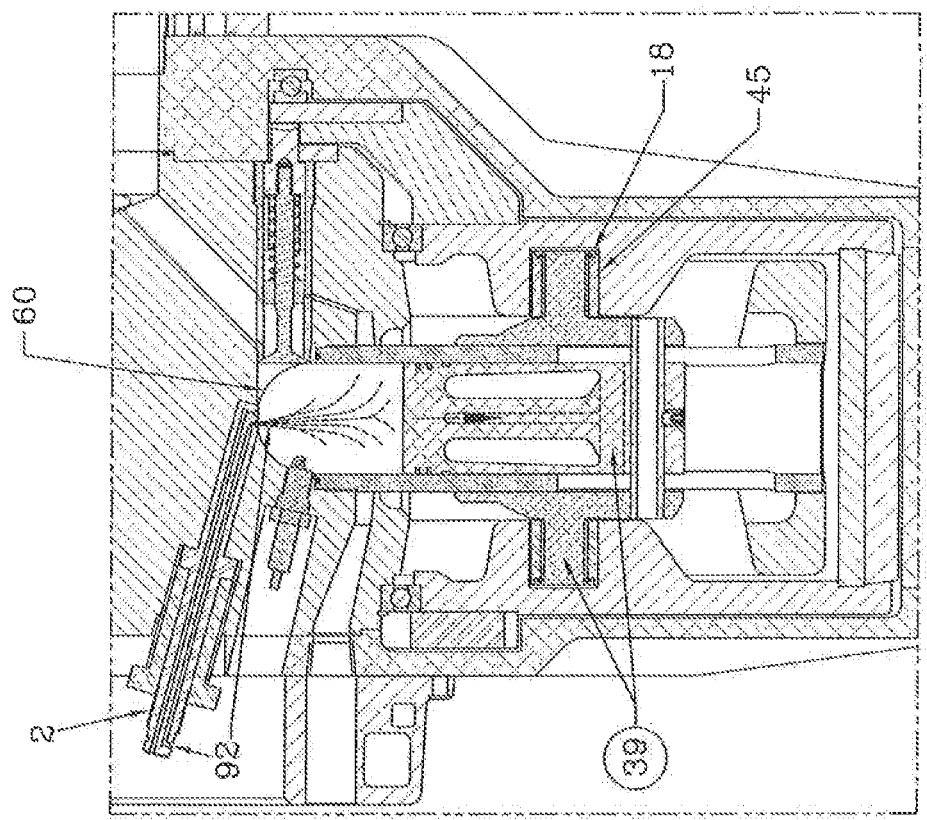
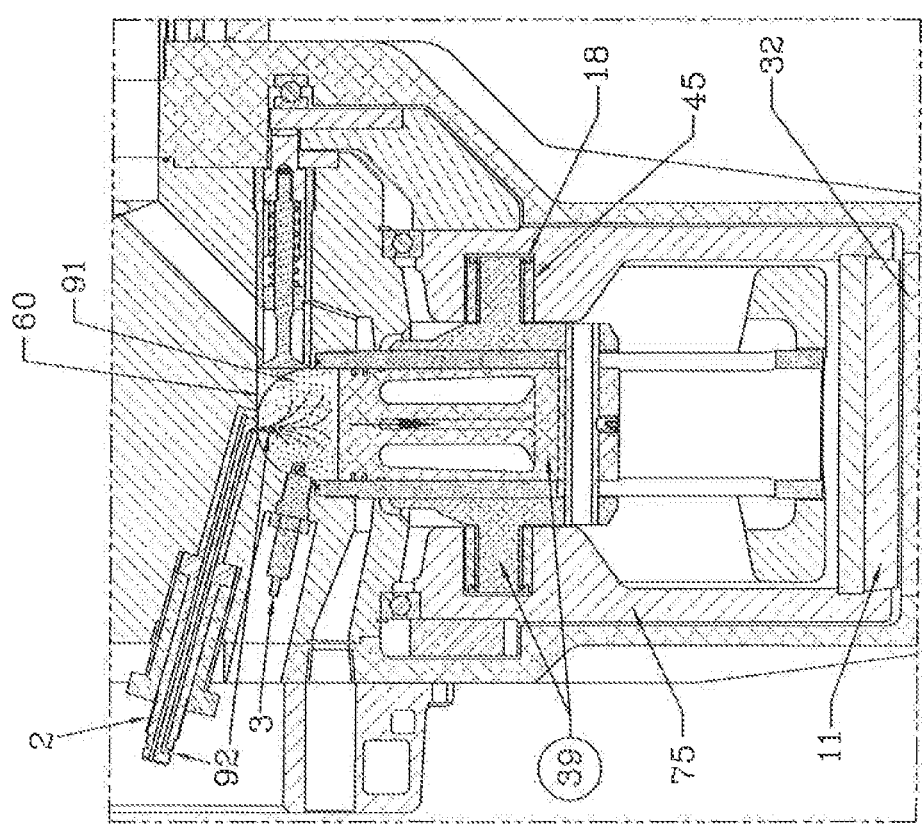

Section View – Position I

Section View – Position H

INTERNAL COMBUSTION ENGINE/GENERATOR WITH PRESSURE BOOST

BACKGROUND OF THE INVENTION

In these times with an ever increasing global population, there is an ever increasing demand for energy. Although energy produced by the consumption of fossil fuels is physically easy, personally convenient and relatively inexpensive now, change is in the air. We consume more fossil fuels now than ever before and the demand is constantly increasing while our reserves continue to be reduced. There are also well-known unintended consequences related to the use of fossil fuels such as air pollution and global warming. It is incumbent on us as stewards of our planet to use only what we need and save all that we can for future generations.

Since the invention of the Otto cycle engine in 1876 there have been many improvements and advancements to the internal combustion (IC) engine design. Yet after 139 years of constant development the IC engine used in a conventional car is still only about 20% efficient. A substantial amount of heat energy is simply wasted. Transforming this wasted heat energy into usable energy is just one of several focal points of this invention.

The basic design of today's internal combustion (IC) engines has gone relatively unchanged. Common IC engines have 2, 4, 8, or even 16 cylinders. Yet all commonly used IC engines share the same basic principles. A piston is forced downward within a cylinder (away from the combustion chamber above) by the pressure of an air/fuel combustion within the combustion chamber causing a connecting rod (attached to both the piston and a crankshaft) to apply off-center forces to a crankshaft causing rotation of the crankshaft. The rotating crankshaft is then coupled either directly (to a propeller, pump or generator etc.), or indirectly (to a clutch or transmission first, then to wheels, hoists or drilling equipment etc.) for the purpose of providing rotating mechanical forces outside of the engine, required to do work outside of the engine.

The most commonly used engines (like the ones used in cars, small planes, buses and trucks etc) are gasoline or diesel powered, 4, 6 or 8 cylinder, four cycle engines. For the purpose of this description of the operation and problems (associated with the most widely used group of engines), we will focus our attention on the standard gasoline fueled—spark ignited—four cycle automobile engine.

Some typical problems of this type of engine include;
1. The operating speed; as the specific function of all IC engines is to provide rotating, mechanical energy outside of the engine (by way of attachment to the crankshaft of the engine), and as most applications that require IC engines also require broad variations in the operating speed of the IC engine (for example; the typical engine used in automobile applications operates between 600 RPM and 6,000 RPM), and as both the low-speed operation and the high-speed operation of the IC engine provide greatly reduced levels of output power and fuel efficiency while producing increased levels of pollutants, the variations in the operating speed of an internal combustion engine are clearly undesirable.
    a. By contrast the engine of the present invention was specifically designed to operate at a relatively fixed speed allowing the design parameters to maximize combustion efficiency, output power and fuel efficiency, while reducing or eliminating the production of pollutants at all times during operation.
2. The crankshaft; the use of a crankshaft in a conventional IC engine (especially in multi-cylinder applications) demands that all facets of the piston movement are identical. The crankshaft dictates that the overall length of the piston stroke during each cycle of operation, the rate of piston acceleration and deceleration during each cycle of operation, and the time spent during each cycle of operation must all remain the same during each cycle of operation.
    a. By contrast the cam-track configuration of the preferred embodiment of the present invention was specifically designed to allow broad variations of the piston movement or non-movement, independently during each of the four (+) cycles of operation provided by this design.
3. Cycles of operation; a 4 cycle engine (the most common design) provides 4 distinct and separate functions which are required in the course of 1 complete combustion cycle. The 4 cycles include the intake cycle (an outward movement of the piston away from the combustion chamber), the compression cycle (an inward movement of the piston towards the combustion chamber), the combustion cycle (this is the only power producing stroke and it is an outward movement of the piston away from the combustion chamber) and the exhaust cycle (an inward movement of the piston towards the combustion chamber). Each of the aforementioned cycles are defined by the 4 distinct yet identical (with the exception of the direction of the piston movement within the cylinder) movements of the piston within the cylinder. Each of the aforementioned cycles of the piston requires 180° of rotation by the crankshaft. Therefore the crankshaft must rotate a total of 720° or two complete rotations in order to accomplish 1 complete combustion event.
    a. By contrast the engine of the preferred embodiment of the present invention can accomplish each of the 4 typical, independent cycles of operation (intake, compression, combustion and exhaust), in combination with the added cylinder purge/cooling cycle, cylinder pre-compression cycle and the pressure boost process, while moving the piston only once in an inward direction towards the combustion chamber during the compression cycle, and once in an outward direction away from the combustion chamber during the combustion & pressure boost cycle or power stroke. Furthermore, the inward movement of the piston during the compression cycle can be independently tailored to provide the most efficient rate of acceleration and speed throughout the compression process. Similarly, the outward movement of the piston during the combustion & pressure boost cycle or power stroke can also be independently tailored to provide the most efficient rate of acceleration and speed throughout the combustion, pressure boost and power stroke process. Furthermore, each of the above-mentioned complete combustion cycles can be accomplished in the engine of the present invention, a minimum of 2 times during the course of a single revolution of the engine, providing (at minimum) 4 times the number of combustion and pressure boost events per cylinder when running at the same speed as a conventional Otto cycle engine with the same number of cylinders. This feature provides significantly greater power density and efficiency.
4. More about the cycles of operation; as noted above in section 3, regarding the operation of a conventional four cycle engine, each of the cycles are defined by the 4 distinct yet identical movements of the piston within the cylinder as dictated by the pistons interaction with the rotating crankshaft. Unfortunately, it is not desirable to have each of the cycles of operation configured in such a way that they are identical in every way. In order to better understand the problem we will look closer at the combustion cycle, which is the only cycle that actually produces working power. Although the piston movement is always dictated by the crankshaft and the reversal of piston direction is always 180° apart, the combustion cycle can be greater than 180°. In order to achieve the greatest working pressure within the cylinder, during the downward piston stroke of the combustion cycle, it is necessary to start the combustion process approximately 12° before the piston reaches the top dead center (TDC) position of the crankshaft. As engine speed increases the spark will need to be advanced even more before TDC to allow sufficient time for the fuel to fully burn during the combustion cycle. In a typical engine the movement of the piston is so fast that the fuel is not completely consumed until the piston reaches approximately 20° after TDC. During high-speed operation of the engine, the piston movement is so fast that the fuel is never completely consumed. The most obvious problem with this series of events is, if the spark is initiated at 12° before TDC (and even earlier during high-speed operation) this means that the combustion of the air/fuel mixture within the cylinder begins during the upward movement of the piston while still in the compression cycle. Therefore, pressure from the early combustion of the air/fuel mixture (added to the already high pressure within the cylinder during the end of the compression cycle), continues to increase applying greater downward pressure on the face of the piston while it is still trying to move upward to its TDC position. This is a negative rotational force, which slows the engine speed, reduces the engines output power and requires the consumption of additional fuel.
   a. By contrast the engine of a preferred embodiment of the present invention eliminates the need to ignite the air/fuel mixture prior to the completion of the compression cycle or TDC. Because of the great flexibility of design offered by the cam-track configuration the piston is allowed to freely reach its TDC position first, thereby producing no negative rotational forces during the process. Ignition starts at TDC and the piston is made to stop its relative movement within the cylinder until such time as the combustion of the air/fuel mixture is partially completed or completed to a point where the downward movement of the piston is considered most desirable and effective. Unlike the typical crankshaft engine mentioned above, the cam-track will provide positive rotational forces as soon as the piston is allowed to begin its descent and throughout its descent to the end of its usable stroke. Unlike the typical crankshaft engine cited above the cam track configuration of a preferred embodiment of the present invention will increase engine speed, increase output power and reduce fuel consumption.

5. There have been several Rotary engines as well as crankshaft style reciprocating piston engines in the past that have attempted to increase the production of power, reduce engine temperature and reduce NOx emissions through the use of water injection systems. But these improvements have the same limitations as other types of crankshaft IC engines.
   a. In the preferred embodiment of the engine of the present invention, the key feature to successful operation and combustion efficiency is consistency. The combination of the unique, relatively fixed-speed cam-style engine having infinitely variable and completely independent control of the pistons motion within the cylinder during any point of any cycle of operation, allows complete independent and predictable control of the combustion process so as to consistently optimize the production of heat energy. Furthermore, this unique cam-style engine design provides completely independent control of the power conversion process so as to further optimize the production of the rotational forces, in order to maximize the production of output power. The combination of these above features, further combined with a separate predictable and independently controllable direct water (or other rapidly expanding medium) injection feature, provides the means to successfully:
     i. stop the linear motion of the piston at the top of its stroke within the cylinder during ignition of the air/fuel mixture and hold that position until such time as the maximum allowable temperature of the gasses are attained prior to allowing the piston to move out and away from the combustion chamber allowing maximum energy production;
     ii. limit the maximum allowable temperature of the gasses within the cylinder during and after the combustion process through the injection of water (or other rapidly expanding medium) so as to control or eliminate the production of NOx gases within the cylinder;
     iii. increase pressure within the cylinder during and after the combustion process through the addition of a secondary steam (or other rapidly expanding medium) producing event within the cylinder during and after the heat producing combustion process so as to increase the production of usable power;
     iv. increase the piston stroke within the cylinder during the combustion/power stroke as a direct result of the combined pressures and increased gaseous volume of the combustion gases and the secondary steam (or other rapidly expanding medium) producing event so as to increase the production of usable power;
     v. maximize the conversion of heat energy into usable work during and after the combustion event through the independent control of the piston speed throughout the extended piston stroke length so as to harvest more usable output power;
     vi. eliminate wasted fuel and power caused by the early ignition of the air/fuel mixture within the cylinder during the compression cycle as is required in a conventional crankshaft engine;
     vii. eliminate wasted fuel and power caused by the incomplete combustion of the air/fuel mixture within the cylinder during high-speed operation of a conventional crankshaft engine;

viii. eliminate wasted fuel and power caused by the poor combustion characteristics of the air/fuel mixture typical during low-speed operation of a conventional crankshaft engine;

ix. reduce the operating temperature of the engine (by using heat energy to convert water or any other suitable rapidly expanding medium to steam or any other environmentally friendly byproduct of expansion) so as to reduce or eliminate the need for an additional cooling system;

x. reduce fuel consumption while increasing operating efficiency and the production of usable output power, by using typically unused heat energy from the combustion process to convert water or any other suitable rapidly expanding medium to steam or any other environmentally friendly byproduct of expansion.

BRIEF SUMMARY OF THE INVENTION

This invention is directed to an improved internal combustion engine and an improved combustion process employing a stationary block rotary engine (similar to that of a modified U.S. Pat. No. 8,113,165 B2) having a piston actuated endless rotary cam-track assembly capable of controlling the motion of the piston so as to optimize the combustion process and the transformation of heat energy produced during the combustion process into increased levels of mechanical output power or electrical energy.

This invention is also directed to a secondary yet symbiotic process within the engine or Engine/Generator where excess heat energy that was produced within the cylinder during the combustion event, and is typically expelled from the engine with the exhaust gases, is further used to promote a chemical reaction which reduces the temperature of the combustion gases so as to reduce or eliminate the production of NOx gases, while further increasing the pressure and volume of the gasses within the cylinder, reducing the required consumption of fuel while providing an extended piston stroke length, the increased production of output power, internal cylinder cooling and a reduction of thermal pollution from the exhaust pipe.

More specifically one or more preferred embodiments of this invention will provide a novel multifaceted combustion process within an engine generally similar to a two-cycle engine where the chain of events will include one or more of the following functions and features:

1. a gas (usually air) is compressed within a cylinder by the inward action of a moving piston within the cylinder as dictated by the pistons interaction with an endless cam-track assembly until the piston reaches the top of its stroke within the cylinder;
2. a liquid or gaseous spark ignited fuel is injected into the cylinder prior to or at the time when the piston reaches the top of its stroke within the cylinder;
3. a liquid or gaseous pressure ignited fuel is injected into the cylinder at or after the piston has reached the top of its stroke within the cylinder;
4. the air/fuel mixture within the cylinder is either spark or pressure ignited but only after the piston reaches the top of the piston stroke increasing efficiency and output power production (unlike conventional engines where ignition is initiated prior to the piston reaching 'top dead center' of the piston stroke thereby producing negative rotational forces, reducing efficiency and output power production while increasing fuel consumption);
5. after ignition the piston is made to remain stopped relative to its position within the cylinder for an extended period of time, then slowly advance its outward motion within the cylinder for a period of time (as best determined by the specific combustion characteristics of the specific fuel being used) during all or part of the combustion process so as to ensure the complete combustion of the air/fuel mixture within the cylinder and maximize the usable effects or heat energy produced during the combustion event within the cylinder prior to allowing the piston to rapidly move out and way front the combustion event;
6. after the increased heat energy which is produced within the cylinder during the combustion process noted above (#5) has maximized the allowable pressure within the cylinder the piston is allowed to move outwardly causing rotation of the endless cam-track assembly and thereby converting heat energy into a more usable form of output power;
7. at a time during or at any point after the completion of the combustion process, there are one or more Pressure Boost events where a rapid expanding liquid or gaseous medium (usually water) is injected directly into the hot combustion gases within the cylinder in order to control and limit the maximum temperature of the combustion gases to levels below that required for the production of NOx gases;
8. at a time during or at any point after the completion of the combustion process, there are one or more Pressure Boost events where a rapid expanding liquid or gaseous medium (usually water) is injected directly into the hot combustion gases within the cylinder causing rapid expansion of the medium within the cylinder producing a further increased volume of gases and pressure against the piston so as to provide increased rotational forces upon the endless cam-track assembly to provide a further increase in usable output power;
9. at a time during or at any point after the completion of the combustion process, there are one or more Pressure Boost events where a rapid expanding liquid or gaseous medium (usually water) is injected directly into the hot combustion gases within the cylinder causing rapid expansion of the medium within the cylinder producing a further increased volume of gases and pressure against the piston so as to provide an increase in the usable piston stroke length further increasing the duration of the rotational forces applied upon the endless cam track assembly to further increase usable output power;
10. the rapid expanding liquid or gaseous medium (for this example—water) which is injected directly into the hot combustion gases within the cylinder will cause rapid expansion of the medium within the cylinder as the water is converted into superheated or dry steam (this phenomenon will provide an increase in the volume and pressure of the gasses within the cylinder to provide a more productive and extended piston stroke length as described above in #8 & #9 ) more importantly this action captures more of the heat energy produced during the combustion process transforming it into additional usable output power thereby reducing the amount of wasted heat energy that is normally expelled from the engine, through the exhaust pipe, and into the atmosphere;
11. the act of transforming the rapid expanding medium from liquid form into a vapor as described above (#10 ) represents a cooling process within the cylinder which will reduce the operating temperature of the cylinder and the entire engine further reducing the size or possibly the need for an additional ancillary cooling system while reducing the temperature of the exhaust gases into the atmosphere.

An object of at least one embodiment of this invention is to provide a more efficient internal combustion engine having independent and infinitely variable control with regard to the motion of the piston and the timing of the combustion event so as to ensure that the combustion event never produces negative rotational forces as caused by a required early ignition of the air/fuel mixture before the piston reaches the top or end of its stroke.

Another object of at least one embodiment of this invention is to utilize the infinitely variable motion control of the piston to maximize the production of heat energy during the combustion process by stopping and or slowing the motion of the piston within the cylinder during the combustion event in order to provide an extended period of time (as determined by the combustion characteristics of the specific fuel being used) for the combustion process to complete, and its effects to be fully optimized before the beginning of the exhaust cycle.

Yet another object of at least one embodiment of this invention is to provide a more efficient internal combustion engine combined with one or more additional independent Pressure Boost events where a rapidly expanding liquid or gaseous medium is directly injected into the hot combustion gases within the cylinder during or at any point after the combustion event so as to cause an increase in the usable volume of the gasses and pressure of the gasses within the cylinder.

Still another object of at least one embodiment of this invention is to combine the independent and infinitely variable control of the piston motion during the combustion event with the additional advantages of the independent Pressure Boost event or events in order to create an environment within the cylinder whereby the combination of both events together can be fully optimized in order to attain the maximum possible production of usable power.

Another object of at least one embodiment of this invention is to combine the independent and infinitely variable control of the piston motion during the entire combustion cycle with the additional advantages offered by the Pressure Boost event or events to limit the temperature of the combustion gases within the cylinder so as to control or eliminate the production of NOx gases throughout the combustion process.

A further object of at least one embodiment of this invention is to combine the independent and infinitely variable control of the piston motion during the entire combustion cycle with the additional advantages offered by the Pressure Boost event or events to transform the maximum amount of heat energy within the cylinder into usable power while providing a substantial cooling effect within the cylinder, engine block, and the exhaust system.

Yet another object of at least one embodiment of this invention is to combine the independent and infinitely variable control of the piston motion during the entire combustion cycle with the additional advantages offered by the Pressure Boost event or events so as to cause the reduction of or the elimination of an additional external cooling system.

An object of at least one embodiment of this invention is to provide a one-piece Engine/Generator configuration having all the added benefits provided by the combination of a Pressure Boost event or events so as to provide an even greater amount of usable electrical output power with reduced fuel consumption.

Another object of at least one embodiment of this invention is to provide a one-piece Engine/Generator configuration having all the added benefits provided by the combination of a Pressure Boost event or events so as to reduce thermal pollution exhausted into the atmosphere.

A further object of at least one embodiment of this invention is to provide an engine or Engine/Generator combination that is even smaller, lighter, more power dense and more thermally efficient than conventional engines or previous Engine/Generator designs.

It is still a further intention of at least one embodiment of the invention to provide a method of increasing the production of usable energy in an internal combustion, piston and cylinder engine, while reducing or eliminating the production of NOx gases.

Another object of at least one embodiment of this invention is to provide a one piece Engine/Generator configuration with a modified piston, having an extended apron used in concert with the independently controlled movement of the piston so as to control the timing and introduction of the cylinder purge/cooling/pre-compression air into the cylinder, in order to eliminate the need for additional internal or external valve means.

BRIEF DESCRIPTION OF THE DRAWING FIGURES

FIG. 1A is an enlarged top sectional view of the improved piston assembly taken to show the top elevation of the assembly generally through the center line of the component parts and with the addition of the top cam bearing;

FIG. 1B is an enlarged side sectional view of the improved piston assembly taken generally through the center line of the assembled component parts;

Figure 1:
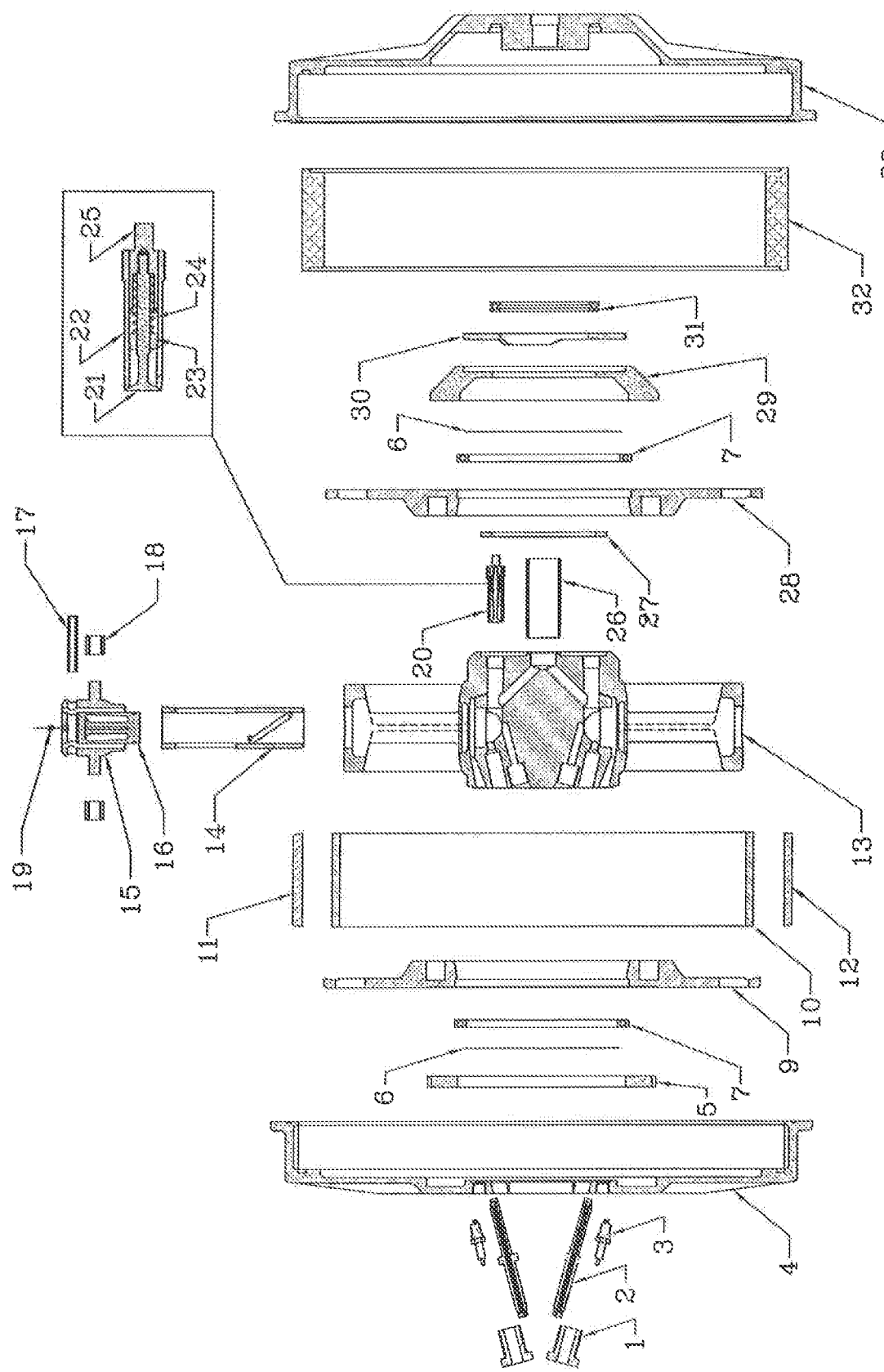
FIG. 1 is an exploded side sectional elevation view of the stationary block Engine/Generator showing the major parts of the Engine/Generator referenced in the hereinafter appearing description of this invention.
Figure 3B:
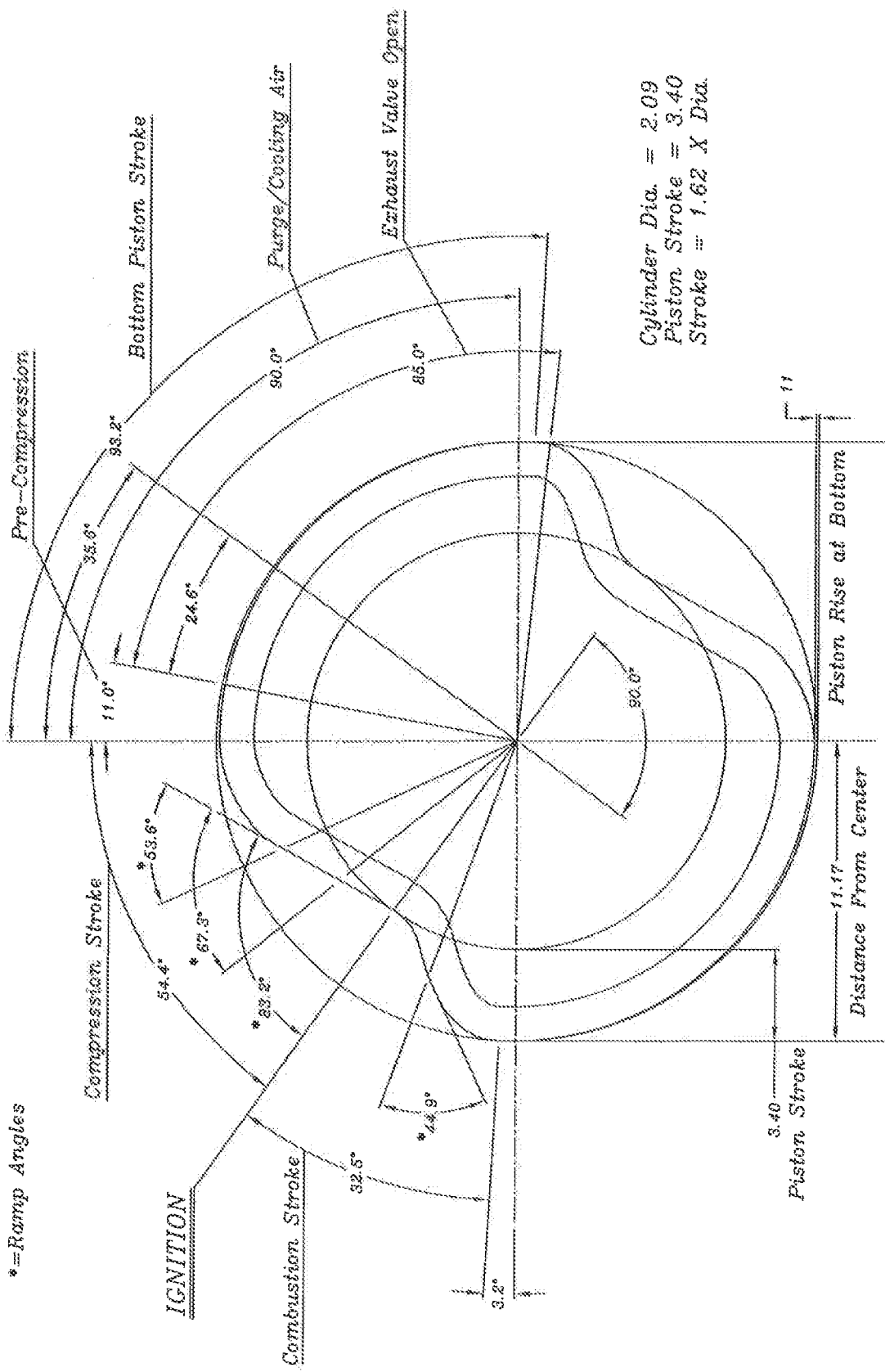
FIG. 3 is a top elevational view of the assembled rotating cam-track/armature parts illustrated in FIG. 2 with the cam-track. surfaces shown highlighted as solid lines for clarity.
FIG. 3A is a full cross-sectional view taken substantially along section line 3A-3A of FIG. 3 to illustrate the assembled side view arrangement of the parts therein.
Figure 3C:
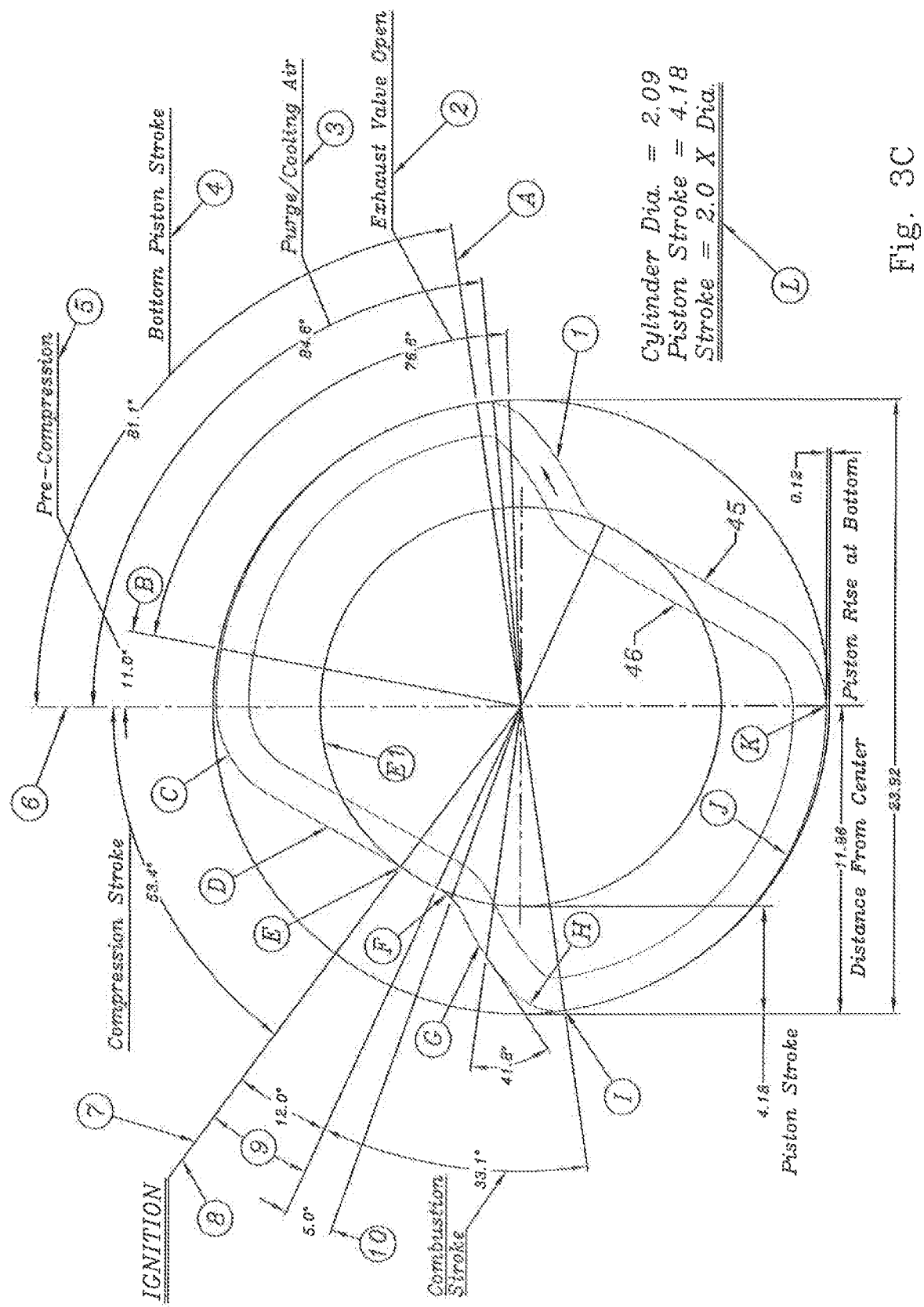
Figure 5:
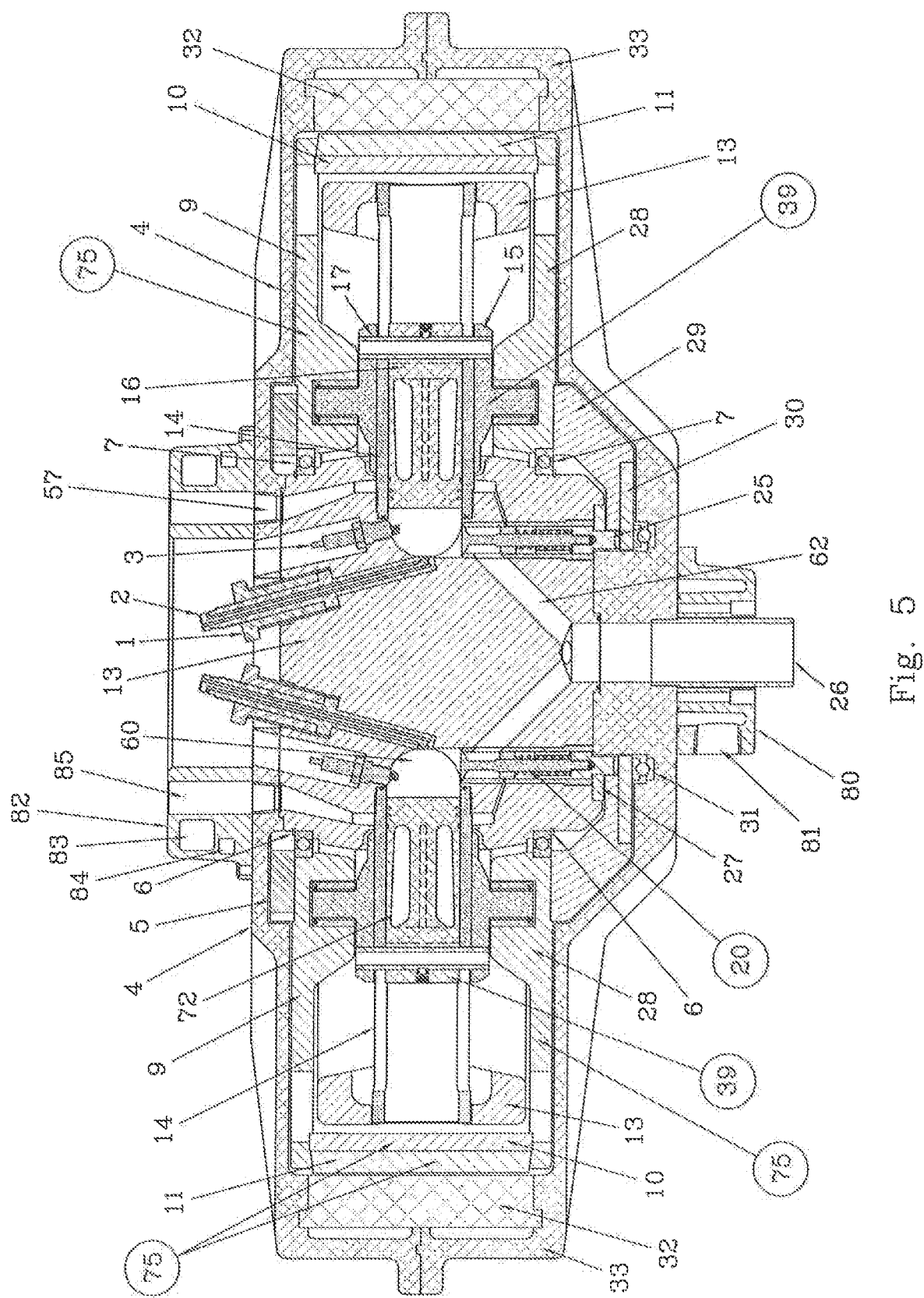
Figure 11:
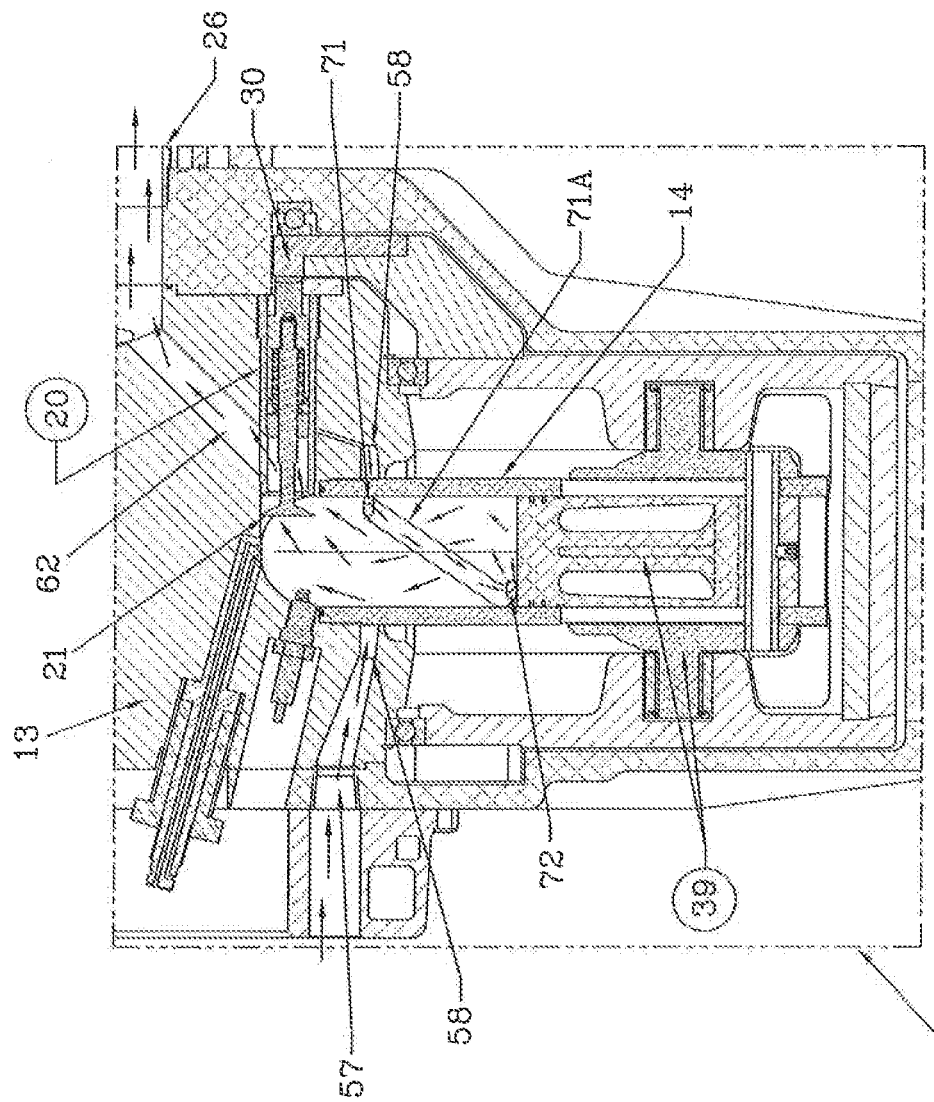
Figure 10:
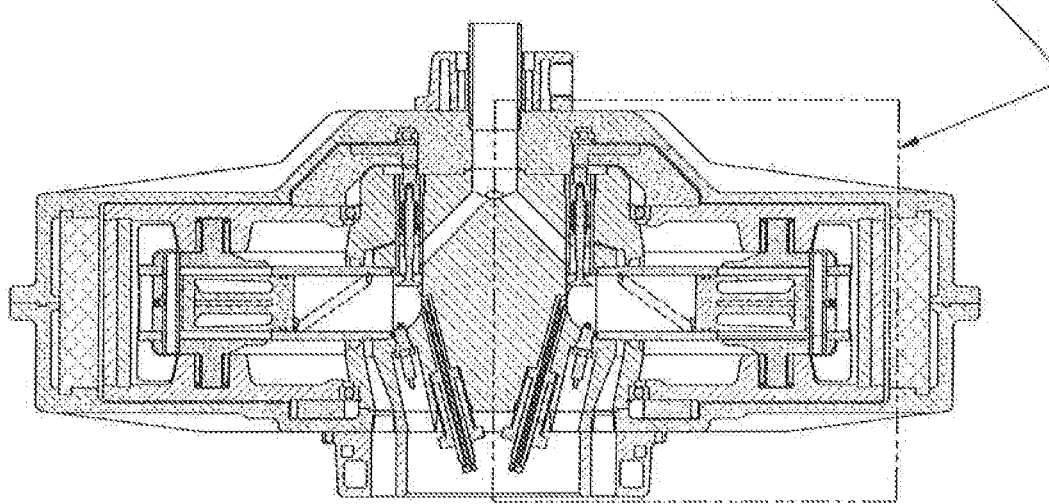
Figure 15:
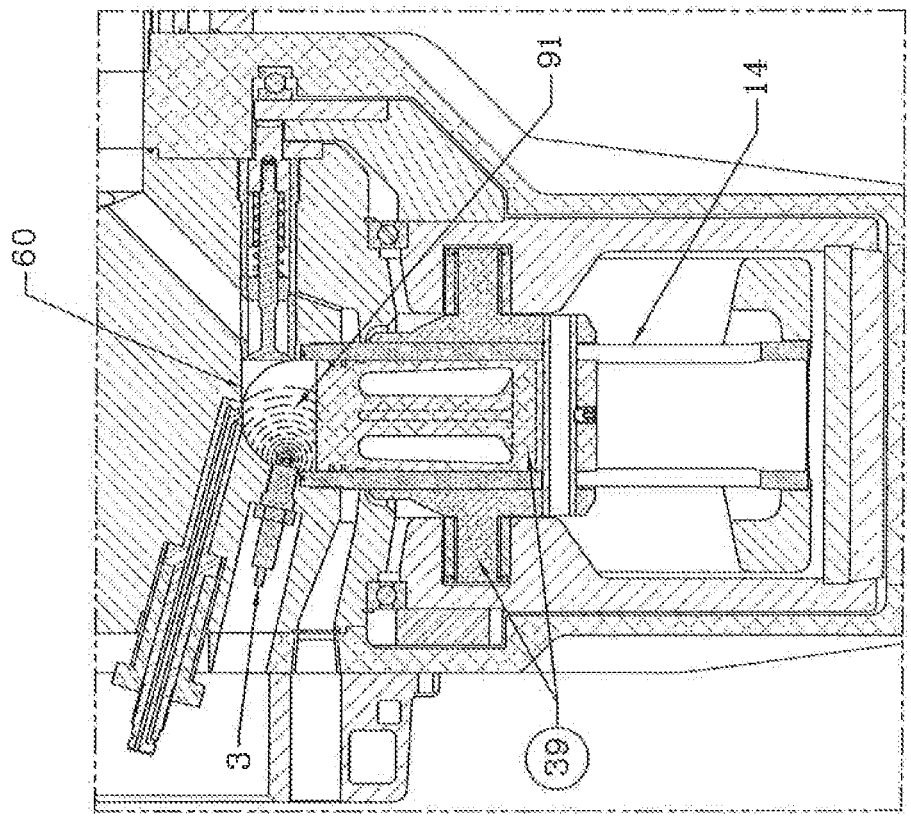
Figure 14:
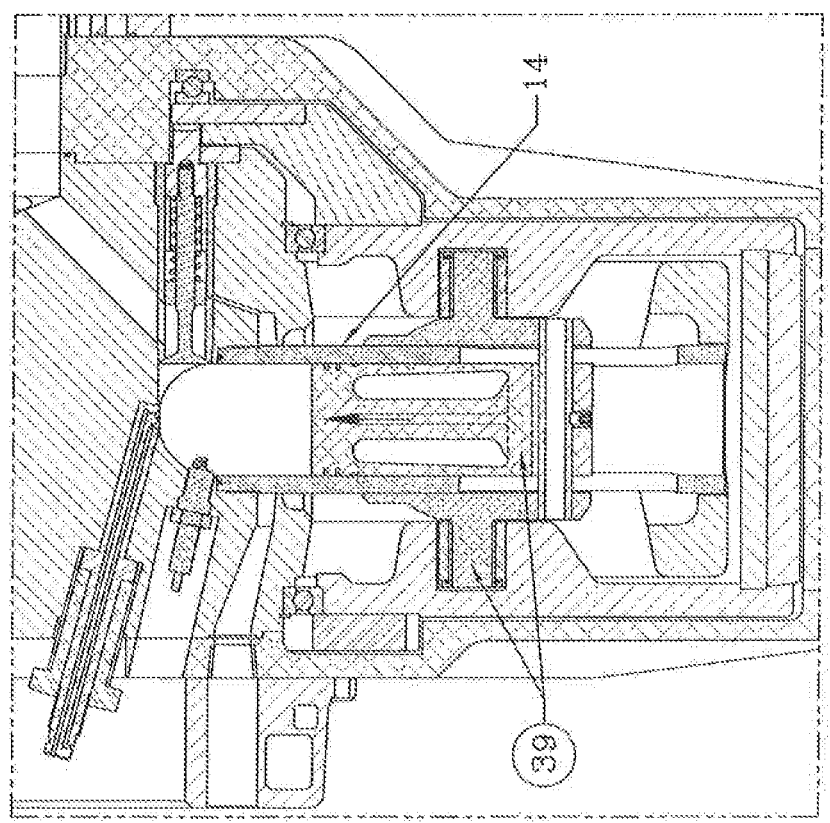
Figure 19:
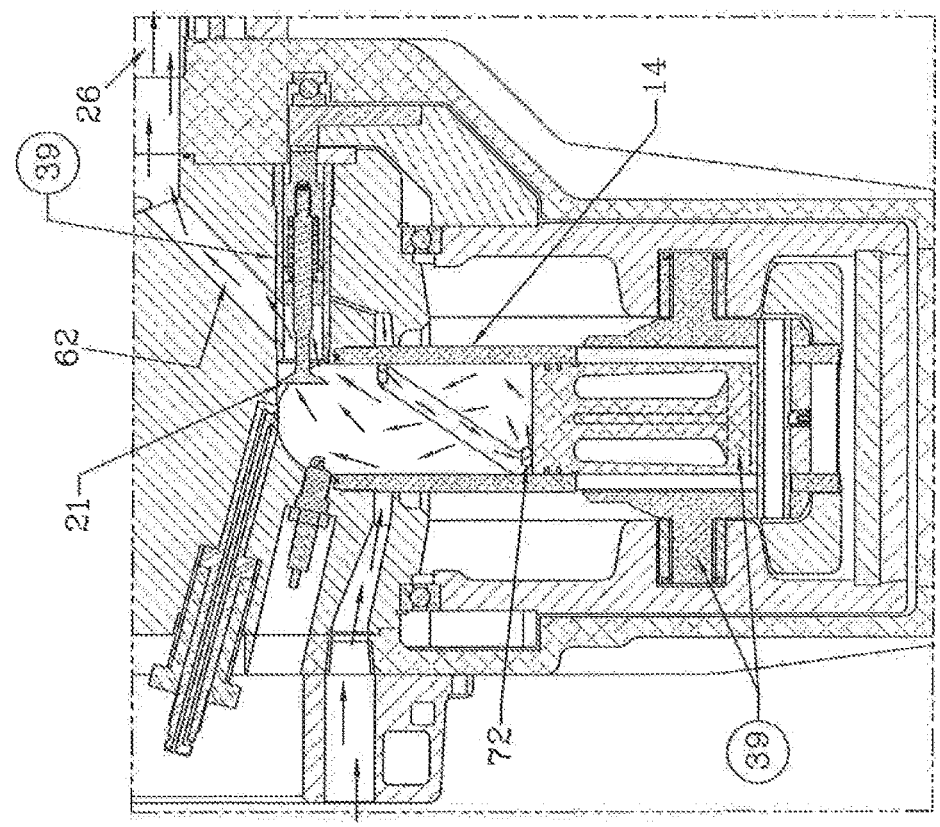
Figure 18:
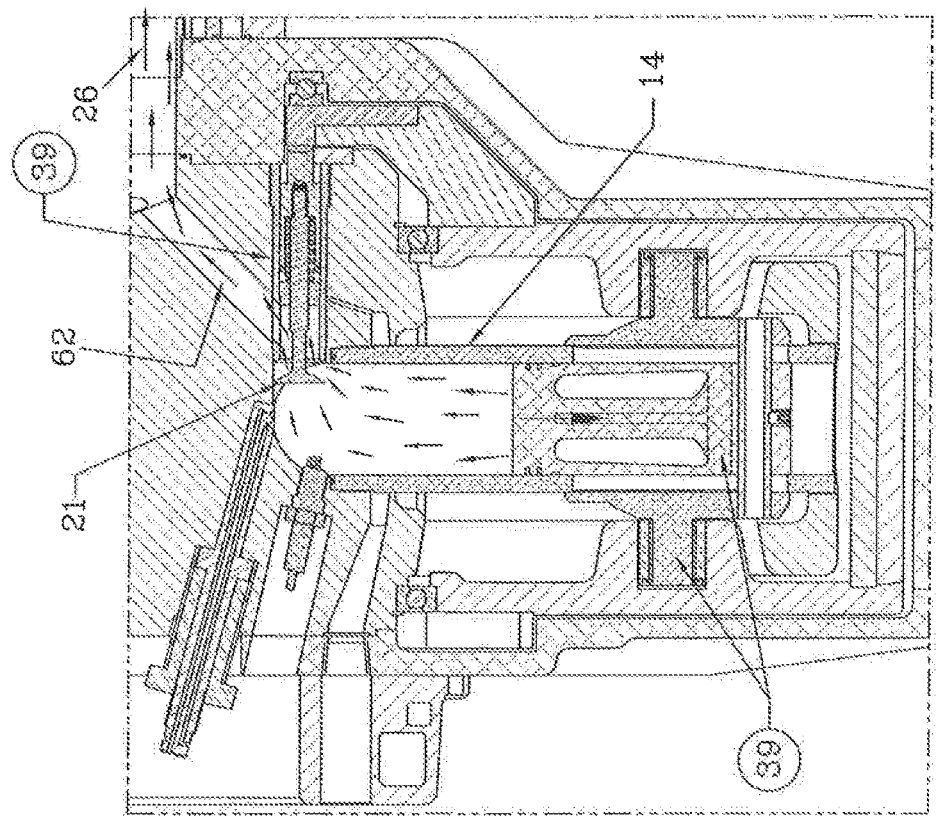
Figure 21:
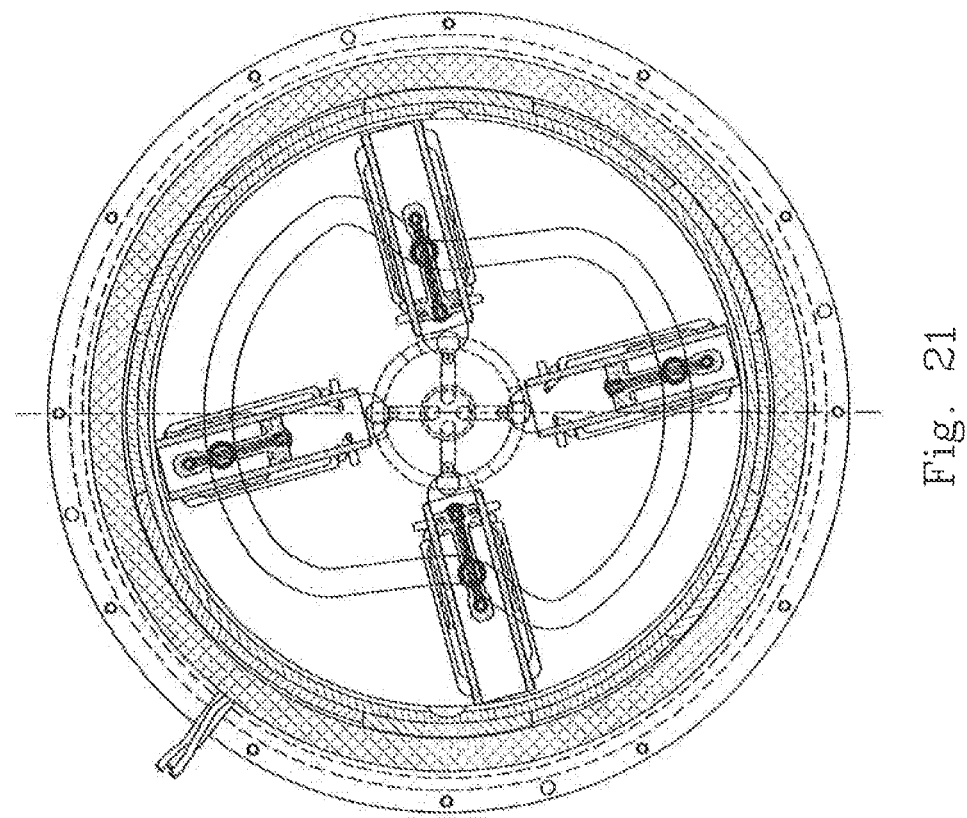
Figure 20:
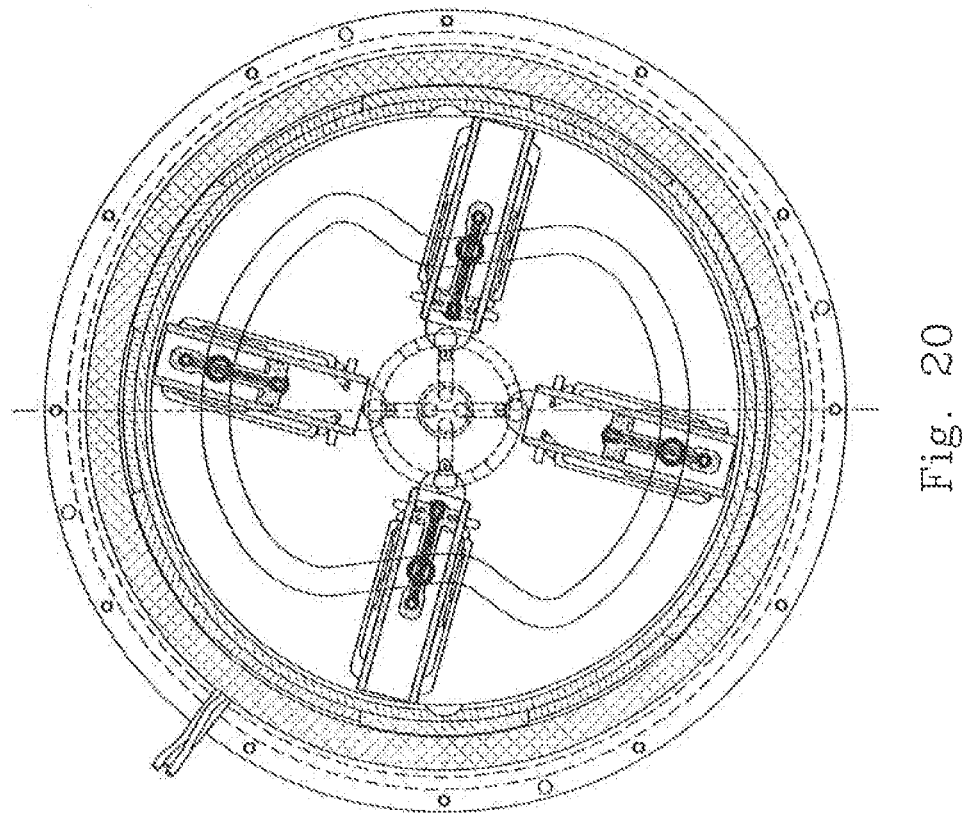

FIG. 3B is a graphic illustration of the preferred embodiment of the cam track as illustrated in U.S. Pat. No. 8,113,165 B2 in which the cam related piston functions are indicated (this drawing is for reference only);

FIG. 3C is a graphic illustration of the preferred embodiment of the can track of the present invention in which the cam related piston functions as well as the cam related pressure boost functions are indicated;

FIG. 4 is a top elevational view of the stationary engine block;

FIG. 4A is a full cross sectional view of the stationary engine block taken substantially along section line 4A-4A of FIG. 4 to clearly illustrate a side view of the internal structure of the stationary engine block;

FIG. 5 is an enlarged full cross sectional side assembly view taken substantially along a section line similar to that used in section line 3A-3A of FIG. 3 two clearly illustrate the assembly of all the major parts of the Engine/Generator as referenced in FIG. 1 in their preferred operating orientation;

FIG. 6 is a top cross sectional view taken substantially along section line 6B-6B of FIG. 6A to illustrate the assembled arrangement of the stationary and the rotating parts therein, except that for the sake of clarity, the engine block and the bottom outer case are not shown as a sectional view;

FIG. 6A is a full cross sectional side view taken substantially along section line 6A-6A of FIG. 6, but assembled and shown with the inclusion of the removed top case of FIG. 6 to illustrate the assembled arrangement of all the parts therein;

FIG. 7 is a top cross sectional view taken substantially along section line 7B-7B of FIG. 7A and is similar to FIG. 6 except for the inclusion of the cam-track layout that is present in the unseen top case and the removal of the radial ball bearings at the cylinders for the purpose of better clarity;

FIG. 7A is a full cross sectional side view with assembled top case similar to FIG. 6A taken substantially along vantage line 7A-7A of FIG. 7 and looking in the direction of the arrows thereon;

FIG. 8 is a top cross sectional view taken substantially along section line 8B-8B of FIG. 8A and similar to FIG. 7 except that the rotating cam track assembly as seen in FIG. 3 and the associated piston assemblies of FIG. 1A are shown after partial rotation of the cam-track assembly;

FIG. 8A is a full cross sectional side view with assembled top case similar to FIG. 7A taken substantially along vantage line 8A-8A of FIG. 8 and looking in the direction of the arrows thereon to show the effect of the rotation of the cam track assembly of FIG. 3 on the piston assemblies of FIG. 1B as well as on the valve assemblies of FIG. 1;

FIG. 9 is a top cross sectional view taken substantially along section line 9B-9B of FIG. 9A and is similar to FIG. 8, except that the rotating cam track assembly as seen in FIG. 3 and the associated piston assemblies of FIG. 1A are shown after additional rotation of the cam track assembly;

FIG. 9A is a full cross sectional side view with assembled top case similar to FIG. 8A taken substantially along vantage line 9A-9A of FIG. 9 and looking in the direction of the arrows thereon to show the effect of the additional rotation of the cam track assembly of FIG. 3 on the piston assemblies of FIG. 1B as well as on the valve assemblies of FIG. 1;

FIG. 10 is a full cross sectional side view with assembled top case similar to FIG. 9A taken substantially along a vantage line 9A-9A of FIG. 9 and looking in the direction of the arrows thereon to show the section window 10A as a reference for the enlarged views of FIGS. 11, 12, 13, 14, 15, 16, 17, 18 and 19;

FIG. 11 is an enlarged cross sectional view of the section window 10A of FIG. 10 wherein the piston assembly is shown to be in position A of a combustion cycle as can be seen at the letter A of FIG. 3C FIG. 12 is an enlarged cross sectional view of the section window 10A of FIG. 10 wherein the piston assembly is shown to be in position B of a combustion cycle as can be seen at the letter B of FIG. 3C FIG. 13 is an enlarged cross sectional view of the section window 10A of FIG. 10 wherein the piston assembly is shown to be in position C of a combustion cycle as can be seen at the letter C of FIG. 3C FIG. 14 is an enlarged cross sectional view of the section window 10A of FIG. 10 wherein the piston assembly is shown to be in position D of a combustion cycle as can be seen at the letter D of FIG. 3C FIG. 15 is an enlarged cross sectional view of the section window 10A of FIG. 10 wherein the piston assembly is shown to be in position E of a combustion cycle as can be seen at the letter E of FIG. 3C FIG. 16 is an enlarged cross sectional view of the section window 10A of FIG. 10 wherein the piston assembly is shown to be in position F of a combustion cycle as can be seen at the letter F of FIG. 3C FIG. 17 is an enlarged cross sectional view of the section window 10A of FIG. 10 wherein the piston assembly is shown to be in position G of a combustion cycle as can be seen at the letter G of FIG. 3C FIG. 18 is an enlarged cross sectional view of the section window 10A of FIG. 10 wherein the piston assembly is shown to be in position H of a combustion cycle as can be seen at the letter H of FIG. 3C FIG. 19 is an enlarged cross sectional view of the section window 10A of FIG. 10 wherein the piston assembly is shown to be in position I of a combustion cycle as can be seen at the letter I of FIG. 3C FIGS. 20 and 21 are top cross sectional views each showing another embodiment similar to those shown in FIGS. 6, 7, 8 and 9, except that the direction in which the cylinders extend radially outward is slightly offset.

Figure 23:
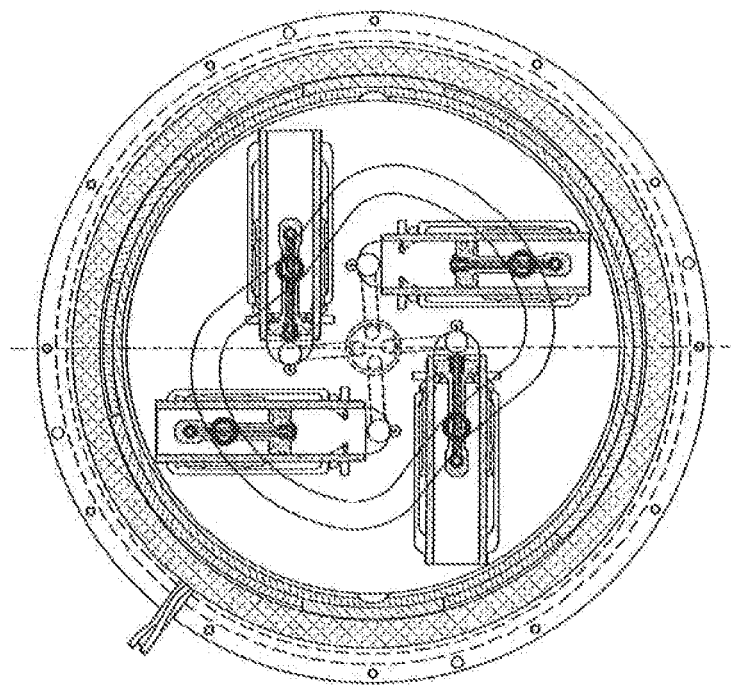
Figure 22:
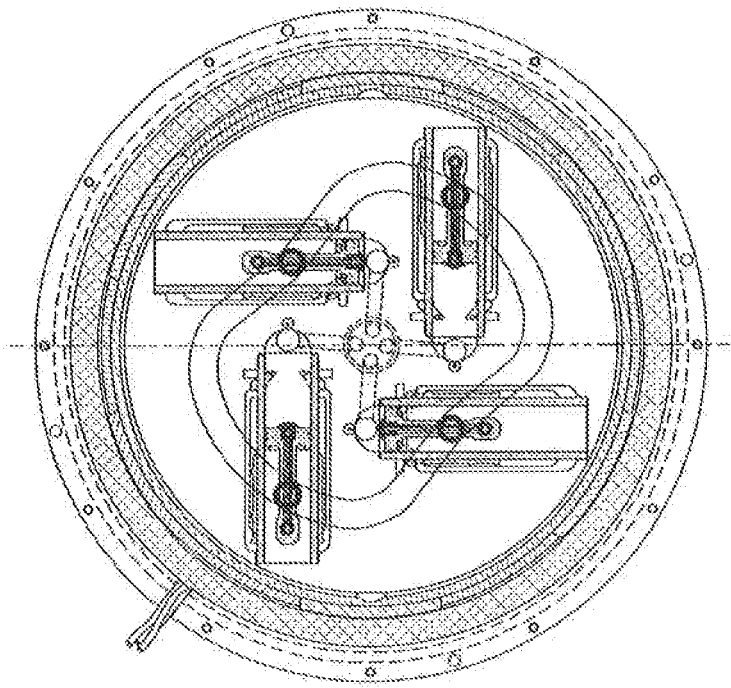

FIGS. 22 and 23 are top cross-sectional views each showing another embodiment in which the cylinders are offset 90° to a radially outward direction from the center.

DETAILED DESCRIPTION OF THE PREFERRED EMBODIMENTS

The description which follows will set forth the features of several preferred embodiments of this invention and more specifically will describe the features of an improved Engine/Generator similar to U.S. Pat. No. 8,113,165 B2 and a unique Pressure Boost system working together yet independently so as to further optimize the relatively fixed speed combustion process as well as the harvesting of the heat energy produced. The Engine/Generator having a modified rotating twin cam-track configuration, an altered piston with an extended piston apron, an altered and extended piston movement and a dual medium fuel/water injector system for the purpose of utilizing the unique Pressure Boost feature of the present invention so as to further optimize and improve the combustion and power take off processes, while increasing output power, reducing fuel consumption, reducing or eliminating the production of NOx gasses during the combustion process, reducing wasted heat energy while substantially reducing thermal pollution from the exhaust gases. While the Engine/Generator can be modified to optimize the combustion of any liquid or gaseous fuels whether spark or pressure ignited, the Pressure Boost system can optimize the use of any suitable rapidly expanding medium to enhance the effects and efficiency of the combustion process. The example of the preferred embodiment that follows will be shown using natural gas as the fuel of choice and water as the rapidly expanding medium of choice. This is not the only form that the Engine/Generator with Pressure Boost of this invention can take, nor is this invention limited by the number of cylinders used or the number of combustion's per revolution. However, the herein described and illustrated form of this invention is the best mode presently contemplated to enable those skilled in the art to practice this invention.

As noted, FIG. 1 is an exploded side sectional elevation view of the Engine/Generator of this invention illustrating its several major parts which will be referenced from time to time in the description of this invention to follow.

It will be noted that the elemental portions of the Engine/Generator illustrated in FIG. 1 are labeled by number for easy and tracking such designated parts throughout the ensuing drawing figures.

As shown for the several parts, a reference number designation for each are as listed below:

| Reference Number | Description |
| --- | --- |
| 1 | Fuel injector clamps |
| 2 | Dual medium fuel/water injectors |
| 3 | Spark plugs |
| 4 | Top case half making up one half of the Engine/Generator enclosure |
| 5 | Ring gear |
| 6 | Snap rings used to retain the radial main bearings |
| 7 | Main radial ball bearings |
| 8 | This number is no longer used |
| 9 | Upper cam-track plate |
| 10 | Armature ring |
| 11 | Armature magnets |
| 12 | Armature clamps |
| 13 | Stationary engine block |
| 14 | Cylinders |
| 15 | Cylinder sleeves |
| 16 | Pistons |
| 17 | Wrist pins |
| 18 | Cam roller assemblies |
| 19 | Locating set screws |
| 20 | Valve assemblies |
| 21 | Valve stem (1 per Valve assembly) |
| 22 | Valve body (1 per Valve assembly) |
| 23 | Valve guide (1 per Valve assembly) |
| 24 | Valve spring (1 per Valve assembly) |
| 25 | Exhaust valve cam (1 per Valve assembly) |
| 26 | Exhaust pipe |
| 27 | Exhaust valve cam alignment bearing |
| 28 | Lower cam-track plate |
| 29 | Exhaust valve actuating cam-ring retainer |
| 30 | Exhaust valve actuating cam-ring |
| 31 | Thrust bearing |
| 32 | Stationary electrical coil |
| 33 | Bottom case half |

There will also be reference made to certain assemblies made up of parts listed above. Those assemblies, and reference number designation for each are as listed below:

| Reference Number | Description |
| --- | --- |
| 20 | Valve assemblies |
| 39 | Piston assemblies |
| 75 | Cam-track/armature assembly |

Turning now to FIG. 1A and FIG. 1B of the drawings, there is depicted an enlarged top sectional view (FIG. 1A) and an enlarged side sectional view (FIG. 1B) of the improved piston assembly 39 taken to show the respective top and side assembly views generally through the center line of the cylinder sleeves 15, the pistons 16 and the wrist pin 17 used to connect the pistons 16 to the cylinder sleeves 15 in a fixed position so that all parts of the piston assembly 39 move together as a single unit through the interaction of the cam roller assemblies 18 and the outside cam-track 45 which will be seen and described in greater detail later in this description. The improved piston 16 is shown having a greatly extended piston apron 16A, which will be used as a valve means to control the introduction of air into the cylinders 14 (FIG. 1) during the cylinder purge/cooling & pre-compression events as will be described in greater detail later in this description.

Figure 2:
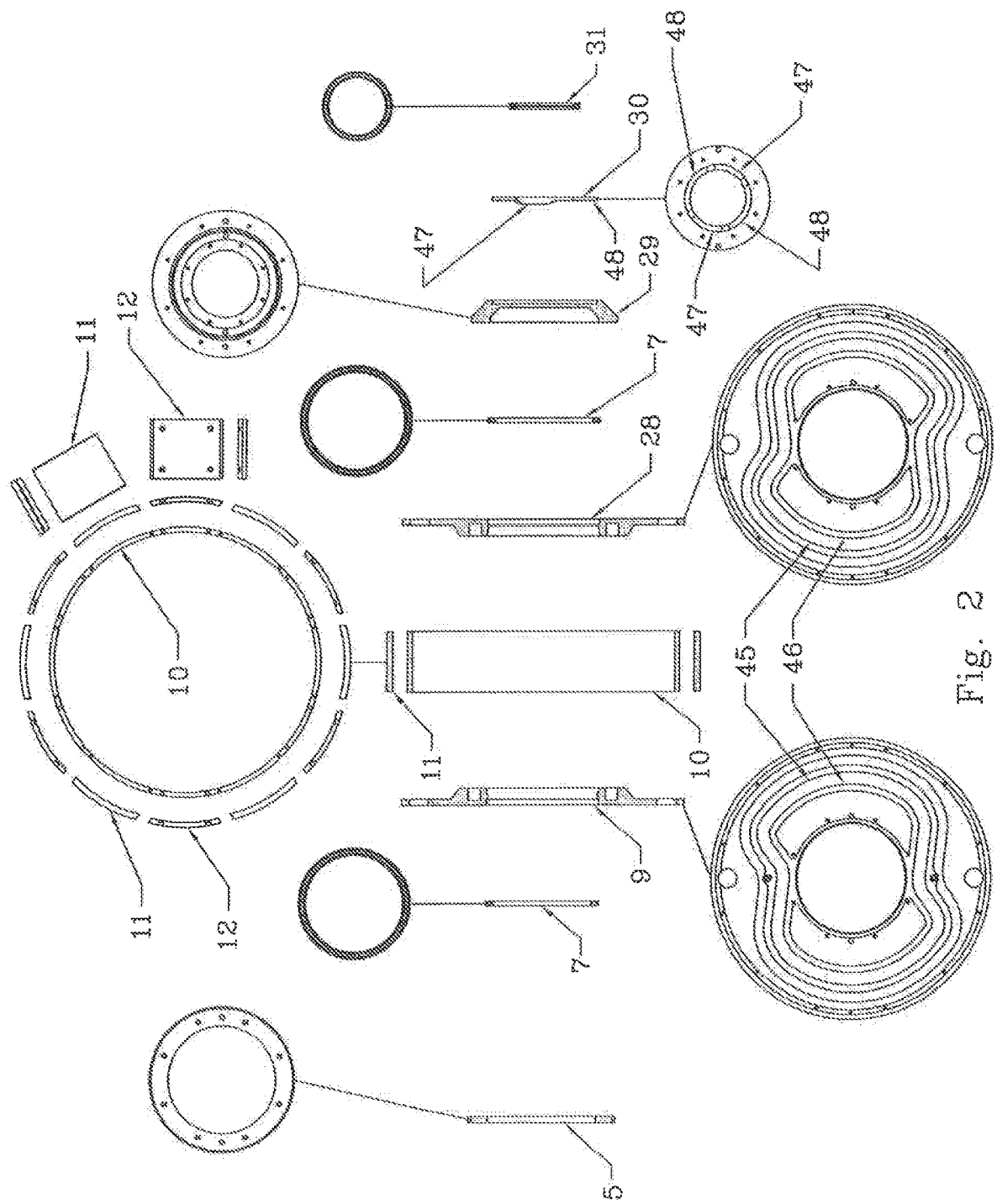
FIG. 2 is an exploded side sectional elevational view and the respective top or bottom elevational views of the parts associated with the rotating cam-track/armature assembly.

FIG. 2 of the drawings is an exploded side sectional elevation view and the respective top or bottom elevational views of the parts associated with the rotating cam-track/armature assembly. The ring gear 5 may be provided as a means by which ancillary equipment (not shown) such as fuel pumps, oil pumps and air pumps etc. can be operated by the rotation of the cam-track/armature assembly. The ring gear 5 is attached by means of standard locating dowels and fasteners to the top face of the upper cam-track plate 9. This attachment also provides a clamping nest for the outer race of one of the two main radial ball bearings 7 that support and provide accurate, low friction rotation of the cam track/armature assembly. The upper cam-track plate 9 may also be provided with a groove near the outside diameter into which the armature ring 10 may be precisely located and attached by means of standard locating dowels and fasteners. The armature ring 10 serves to provide a precise dimension between the upper cam-track plate 9 and the lower cam-track plate 28 which may also be provided with a groove near the outside diameter into which the armature ring 10 may be precisely located and attached by means of standard locating dowels and fasteners. The armature ring 10 also serves to provide a concentric outside diameter onto which the armature magnets 11 may be located and clamped by the armature clamps 12 which are provided angular ends to complement the angular ends of the armature magnets 11. The armature clamps 12 may be provided with mounting holes made to accept standard fasteners which may threadably connect the armature clamps 12 to the armature ring 10 in order to provide accurate spacing and clamping means for the armature magnets 11. The armature magnets 11 and the armature clamps 12 may also be centered, aligned and clamped by their interaction with complementing angular faces provided in the upper cam-track plate 9 and the lower cam-track plate 28 as can be seen in the assembly drawing FIG. 3A. The lower cam-track plate 28 is also provided with the second of the two main radial bearings 7, preferably ball bearings or roller bearings, that support and provide accurate, low friction rotation of the cam-track/armature assembly. The lower main radial bearing 7 may also fit into a nest in the lower cam-track plate 28, and the outer race of the bearing may be clamped by the attachment of the exhaust valve actuating cam-ring retainer 29 by means of standard locating dowels and fasteners into the lower cam-track plate 28. The exhaust valve actuating cam-ring 30 with its two raised cam-lands 47 and its two lower cam-lands 48 is located by a machined pocket in the exhaust valve actuating cam-ring retainer 29 and securely mounted by means of standard locating dowels and fasteners. The weight of the entire rotating assembly and the pressure exerted by the forces applied to the two raised cam-lands 47 during operation of the Engine/Generator is applied to the thrust bearing 31, preferably a ball bearing type thrust bearing, which is in full contact with the cam-ring 30. The cam-ring 30 is an optional feature. The valves may be actuated by any conventional mechanical or electro-mechanical means.

In a certain preferred embodiment, the valves may be operated by independent electro/magnetic actuators, or some like devices, and controlled by a computer processor. This is particularly useful in an embodiment in which the use of various different fuels may be desirable. The pressure in the combustion chamber, and by extension the proportions of the air/fuel mixture, can be regulated and modified during operation (on-the-fly) in order to optimize the combustion characteristics of multiple fuel types by controlling the timing of the exhaust valves closing. For example, when the engine is operating during periods of heavy load a high-energy fuel, such as diesel fuel, which requires much higher cylinder pressures may be more desirable. The exhaust valve in this example would be made to close early, shortening the internal cylinder cooling cycle and allowing more time in the pre-compression mode prior to the inward movement of the piston to pre-pressurize the cylinder with fresh air. This action will provide much higher cylinder pressures after the compression cycle. Conversely, during times of low output requirements and low engine loads a less powerful but cleaner and less expensive fuel such as natural gas may be more desirable. During these times the compression ratio in the cylinders would be reduced by closing the exhaust valve later, even after the inward movement of the piston has begun in the compression cycle, thereby allowing fresh air within the cylinder to escape out the exhaust valve reducing the volume of air to be compressed in the cylinder. This action also reduces the operating loads within the engine further increasing efficiency of operation.

It should be noted that even in the situation of a single fuel being used it may he advantageous to control cylinder pressure and the amount of fresh air provided within the cylinder based on load. Independently increasing the amount of compressed air within the cylinder as the operational load and by extension the demand for additional fuel increases ensures a more optimized combustion process and greater efficiency. Conversely, the valves may be timed to lower cylinder pressure and fresh air volume within the cylinder as the amount of load and the demand for fuel is simultaneously decreased.

The computer processor mentioned above may be pre-programmed to time the actuation of the valves based upon input for certain fuel types, and load values. Alternatively, or in conjunction with the above the engine may be provided with combustion, engine heat and exhaust gas sensors. The feedback from those sensors may be input into the computer processor to optimize the valve timing automatically based on current conditions.

It should be further noted that the above-mentioned computer processor would also be used to independently monitor and control the Pressure Boost process, which is the dominant feature of the preferred embodiment of this invention. The Pressure Boost feature (which will be explained in greater detail later in this document), whether combined with independent valve control or not is provided to more fully optimize the combustion process, capture and convert more heat energy from the combustion process thereby increasing output power, while reducing engine temperature, fuel consumption, the production of NOx gases and the wasteful/polluting exhaust of substantial amounts of unused heat energy into the atmosphere.

Attention should be given to the two opposing top and bottom views of the upper cam-track plate 9 and the lower cam-track plate 28 where the outer cam-track surface 45 and the inner cam-track surface 46 can be seen. It should be clear that the cam-track configurations for both the upper plate 9 and the lower plate 28 are mirror images of each other. It should also be noted that the precise alignment of the cam-track plates may be assured by the use of standard locating dowels and fasteners when assembled to the armature ring 10.

FIG. 3 is a top elevational view of the assembled rotating cam-track/armature parts illustrated in FIG. 2 with the outer cam-track surface 45 and the inner cam-track surface 46 shown highlighted as solid lines for clarity. FIG. 3A is a full cross-sectional view taken substantially along section line 3A-3A of FIG. 3 to illustrate the assembled side view arrangement of the rotating cam-track/armature parts therein. Both FIG. 3 and FIG. 3A depict the arrangement and interaction of the assembled parts. The ring gear 5 is clearly seen in FIG. 3 and FIG. 3A. In FIG. 3 the ring gear 5 is clearly seen attached by means of standard locating dowels and fasteners to the upper cam-track plate 9. The main radial bearings 7 are also clearly visible in FIG. 3, and the nested and clamped arrangement of the outer bearing race of the upper and lower main radial ball bearings 7 is evident in FIG. 3A.

The armature ring 10 can be seen in FIG. 3 as well as the locating dowels 50 and the standard fasteners 51 that are used to ensure the precise location of the upper cam-track plate 9 relative to the armature ring 10. It should be understood that the same precise location and fastening means may be used to secure the armature ring 10 to the lower cam-track plate 28. Precise construction holes 49 may be provided in both the upper cam-track plate 9 and the lower cam-track plate 28. These holes may serve not only to ensure the precise location of the upper plate 9 and the lower plate 28 during machining, but may be provided as a vent, or escape hole to prevent the accumulation of lubricating oil in the rotating cam-track assembly during operation. In FIG. 3A the grooves near the outside diameter of the upper cam-track plate 9 and the lower cam-track plate 28, into which the armature ring 10 may be precisely located and attached, can be clearly seen. The angular clamping arrangement of the upper plate 9 and the lower plate 28 on the armature magnets 11 are also evident in FIG. 3A. In FIG. 3, the armature magnets 11 with their angular ends can be seen as they interact with the angular ends of the armature clamps 12 which may be threadably attached to the armature ring 10 by means of the standard fasteners 52 providing precise and secure location of the armature magnets 11 on the outermost diameter of the cam-track/armature assembly.

In FIG. 3A, the exhaust valve actuating cam-ring retainer 29 can be seen located in an under-cut portion of the lower cam-track plate 28 where it is securely held in place and positioned by standard locating dowels and Fasteners. The nested and clamped arrangement of the outer bearing race of the lower main radial ball bearing 7 is again evident because of the attachment of the actuating cam-ring retainer 29 to the cam-track plate 28. The exhaust valve actuating cam-ring 30 may also be located in an under-cut portion of the exhaust valve actuating cam-ring retainer 29 where it may also be securely held in place and positioned by standard locating dowels and fasteners. The preferred orientation of the exhaust valve actuating cam-ring 30 and it's too raised cam lands 47 can be seen in FIG. 3 and in FIG. 3A.

Finally, the entire assembly of the cam-track. and the generator-armature parts as seen in FIG. 3 and FIG. 3A will be referred to in the remainder of this description as the cam-track/armature assembly 75. In FIG. 3A the cam-track/armature assembly 75 can be seen resting on the thrust bearing 31 which would be oriented on a horizontal plane at the bottom of the cam-track/armature assembly 75. The thrust bearing 31 is oriented on the same centerline as the cam-track/armature assembly, directly under the raised cam lands 47 and is in full surface contact with the bottom surface of the exhaust valve actuating cam-ring 30. The thrust bearing 31 is located in a pocket in the bottom of the case half 33 (see FIG. 5) which will be seen in detail later in this description.

FIG. 3B is a graphic illustration of the preferred embodiment of the cam-track shown in U.S. Pat. No. 8,113,165 B2 in which the cam related piston functions are indicated. FIG. 3B is provided for reference only. However, it should be noted in FIG. 3B that there is no dwell period shown at the end of the compression stroke or the beginning of the combustion stroke at the point designated ignition. Furthermore, although the cylinder diameter in FIG. 3B (shown only for the purpose of example) is the same as that shown in FIG. 3C (also shown only for the purpose of example) the proportional, power producing, piston stroke length in FIG. 3C (shown at the letter L) is clearly longer than that described in FIG. 3B, this improvement related to the Pressure Boost system will be described in greater detail later in this description.

FIG. 3C is a graphic illustration of the preferred embodiment of the cam-track of the current invention in which the cam related piston functions are indicated by numbers 1 through 10, and the related Pressure Boost functions are indicated by the letters A through L. It should be clear that in this preferred embodiment, the cam-track configuration is such that each cylinder of the Engine/Generator will provide two complete combustion events in the course of a single 360° rotation of the cam-track/armature assembly 75. Therefore, the four cylinder Engine/Generator which is shown will produce eight complete combustion events in the course of one single rotation of the cam-track/armature assembly 75. It must be understood that the number of cylinders as well as the number of combustion events per revolution is only limited by the physical size and output requirement of the particular Engine/Generator design. There are no limitations on the number of cylinders, magnets/electromagnets or combustion's per revolution implied in this preferred embodiment. It should also be noted that FIG. 3C is only provided to clearly show the great flexibility of the design features and options that are offered by this configuration.

It will be noted that the engine hereof is in many respects similar to the teaching and disclosure of a four-cylinder engine set forth in my prior U.S. Pat. No. 4,653,438 issued Mar. 31, 1987, entitled "Rotary Engine" and also in my disclosure of the six-cylinder engine/generator set forth in my prior U.S. Pat. No. 6,230,670 B1 issued May 15, 2001 entitled "Engine Generator" and also in my disclosure of a four-cylinder engine/generator set forth in my prior U.S. Pat. No. 8,113,165 B2 issued Feb. 14, 2012 entitled "Stationary Block Rotary Engine/Generator" all of which are incorporated herein by reference in their entirety. Certain exceptions to the later "Stationary Block Rotary Engine/Generator" of that patent are found in; the extended dwell between the end of the compression stroke and the beginning of the combustion stroke starting at the point of ignition Where the piston is made to stop its linear motion within the cylinder during the combustion event until such time as the combustion process for any specific liquid or gaseous, spark or pressure ignited fuel has completed to a point that is considered most desirable as related to the specific fuel being used prior to allow the outward movement of the piston assembly 39 and the conversion of the outward/linear movement of the piston 16 within the cylinder 14 into rotational movement of the cam-track/armature assembly 75; the dual medium fuel/water injectors 2 used in the Pressure Boost feature; the configuration of the cam-tracks 45 and 46 of the rotating cam-track/armature assembly 75; the extended piston stroke length made possible by the addition of the Pressure Boost feature of the current invention; the increased output power provided by the addition of the Pressure Boost feature of the current invention; the improved heat capture capabilities provided by the addition of the Pressure Boost feature of the current invention; the reduction or elimination of NOx gases provided by the addition of the Pressure Boost feature of the current invention; the reduction of thermal pollution introduced into the atmosphere as a result of the Pressure Boost feature of the current invention; and the improved piston 16 of the current invention, having a greatly extended piston apron 16A, which will be used as a valve means to control the introduction of air into the cylinders 14 during the cylinder purge/cooling & pre-compression events. It should also be noted that the cylinders used in this current invention are modified from my prior U.S. Pat. No. 5,636,599 issued Jun. 10, 1997, entitled "Cylinder Assembly" and the valve assemblies used in this current invention are from my prior U.S. Pat. No. 5,701,930 issued Dec. 30, 1997 entitled "Modular Valve Assembly", both of which are incorporated by reference in their entirety.

Turning now to FIG. 4 and FIG. 4A, in general it is to be understood that the engine portion of the Engine/Generator comprises a stationary engine block 13. The stationary engine block 13 may have a shape similar to that of a wheel with a central hub that contains the combustion chambers 60, bores 59 to receive and threadably secure the exhaust valve assemblies 20 (FIG. 1) and exhaust bores 62 to communicate exhaust gases to the threaded exhaust pipe 26 (FIG. 1). There may be a radial groove 63 provided in the engine block 13 to accept the exhaust valve cam alignment bearing 27 (FIG. 1) which may be used to ensure the proper alignment of the exhaust valve cams 25 (FIG. 1). The 2 main radial bearings 7 (FIG. 1) may be located with a light resistance fit on surfaces 55 and secured by snap rings 6 (FIG. 1) that fit into the snap ring slots 56 of the stationary engine block 13. During operation, cylinder purge and cooling air may be conveyed into the cylinders through the purge air port 57 into a relief groove 58 that surrounds the cylinders 14 (FIG. 1) and directed into the cylinder through the cast port 71 (FIG. 8A) which may be located through the outside diameter wall of the cylinder (14) and into the cylinder at the cast port 72 (FIG. 8A) which may be located through the inside diameter wall of cylinder 14. The dual fuel/water injector bore 61 with a counter bored seat may be provided for each combustion chamber ending at the innermost quadrant of the hemispherical combustion chamber 60 (or ending at any other position in the combustion chamber that may be considered most desirable). This dual fuel/water injector bore 61 may be used to accept the dual fuel/water injectors 2 (FIG. 1) and thereby convey fuel and/or water simultaneously or independently at the proper time prior to, during or after the combustion event. In this view, eight coolant holes 64 are shown which are cast into the hub portion of the stationary engine block 13 these cast holes may be located in close proximity to the combustion chambers 60 as well as the bores 59 used to receive the exhaust valve assemblies (20 in FIG. 1) and provide cooling to those areas were combustion heat is concentrated. It should be noted that the use of the above-mentioned coolant holes 64 may not be required due to the cooling effect provided by the Pressure Boost feature of the present invention. Looking now toward the outside diameter of the stationary engine block 13, four open windows are optionally provided through the stationary engine block 13 defined by eight parallel curved stiffening walls. These stiffening walls are further defined by the cross sectional view (54 in. FIG. 4). The web sections between the adjoining stiffening walls may be provided with holes 53 through the web to reduce weight and allow lubricating oil to drain freely. The purpose of the webs and the stiffening walls is to provide rigid support for the outermost ring of the stationary engine block 13 which is used to support the outermost ends of the cylinders 14 (FIG. 1). The cylinders 14 (FIG. 1) may be threadably attached to the stationary engine block 13 at both ends of the cylinders using the threaded sections (66 in FIG. 4 and FIG. 4A). It should be understood that although the two threaded sections 66 of the engine block 13 possess the same thread pitch and thread timing the threaded portion at the outermost diameter of the stationary block 13 will be of a larger diameter than that in the innermost threaded portion so as to allow the secure and easy insertion of the cylinders 14.

FIG. 5 is a complete assembly of all the parts noted in FIG. 1 including the addition of the doughnut shaped upper manifold 82 which is used to convey lubricating oil carried through the cast radial port 84 into the engine by way of lubrication holes through the uppercase 4 (not shown), as well as coolant (if required) carried through the cast radial port 83 and in communication with holes in the uppercase 4 (not shown) which are in communication with the coolant holes 64 (FIG. 4) within the stationary engine block 13. The cast holes 85 in the upper manifold 82 allow access for attachment of air supply pipes (not shown) to be threadably attached to the uppercase 4 so as to convey air into port 57 of the stationary engine block 13 and ultimately into the cylinder/combustion chamber through port 72 (FIG. 8A) which extends through the inside diameter of the cylinders 14. There is also an additional doughnut shaped lower manifold 80 to he used (if required) to convey coolant into the engine through the lower case 33 and communicating with the coolant holes 64 (FIG. 4) within the stationary engine block 13. This view also shows the preferred embodiment of the Engine/Generator in its preferred operating position which is horizontally oriented with the exhaust pipe 26 located on the bottom during operation. Two of the four valve assemblies 20, and two of the four piston assemblies 39 can be seen as well as the rotating cam-track/armature assembly 75. The cylinders 14 can be seen threadably attached to the stationary engine block 13. The pistons 16 (FIGS. 1A and 1B) of the piston assembly 39 can be seen inside the cylinders 14 and attached to the cylinder sleeves 15 (FIGS. 1A and 1B) which are in a slip arrangement with the outside diameter of the cylinders 14 and connected to the pistons 16 (FIGS. 1A and 1B) by the wrist pins 17 making the complete piston assembly 39.

FIG. 6 and FIG. 6A are paired together to show the operation of the stationary block Engine/Generator from 2 related vantage points. FIG. 6 is a top cross-sectional view taken substantially along section line 6B-6B of FIG. 6A to illustrate the assembled arrangement of the stationary and the rotating parts therein, except that for the sake of clarity the engine block 13 and the bottom case half 33 are not shown hatched as a sectional view, and the cam roller assemblies (18 in FIG. 1A) are shown to aid in the clarity of the description of the operating events that follow. FIG. 6A is a full cross-sectional side view taken substantially along section line 6A-6A of FIG. 6, but assembled and shown with the inclusion of the removed top case 4 and all the associated parts therein of FIG. 6 to illustrate the assembled arrangement of all the parts therein.

FIG. 6 shows several features of the assembly. The outermost diameter of the bottom case half 33 is shown, as well as the flange where the standard locating dowels and fasteners are used to securely attach the 2 case halves in assembly. The stationary electrical coil 32 and the coil output wires 67 that are used to transmit electrical energy produced through the interaction of the rotating armature magnets 11 of the rotating cam-track/armature assembly 75 as they pass the coil windings of the stationary electrical coil 32 in response to the ignition of fuel and the expansion of the rapidly expanding medium (water) injected into the combustion chambers 60 during and after the combustion process. The cylinders 14 can again be seen, in this top view, threadably attached to the stationary engine block 13. The pistons 16 of the piston assembly 39 can be seen inside the cylinders 14 and attached to the cylinder sleeves 15 (FIGS. 1A and 1B) which are in a slip fit arrangement with the outside diameter of the cylinders 14 and connected to the pistons 16 by the wrist pin 17 (FIGS. 1A and 1B), making the complete piston assembly 39. Special consideration should be given to the main radial bearings 7 as seen in FIG. 6. In this view the entire lower main radial bearing 7 is shown, however, in all future top views of the Engine/Generator the lower main radial bearing 7 will be shown only partially for the purpose of increased clarity. The lower main radial bearings 7 will not be shown within the area defined by the outside diameter of the cylinders 14 of any future top views. Finally in this view the 8 coolant holes 64 are again visible in close proximity to the combustion chambers 60.

Both related views FIGS. 6 and 6A show additional cooling features. These cooling features are directed to the cooling of the sealed stationary electrical coil 32 within the stationary case 4, 33. Preferably, there may be a radial under-cut portion 69 provided in both the stationary upper case half 4 and the lower case half 33. Although, any number of undercut portions 69 may be provided. As shown, these under-cuts provide 2 separate spaces, channels or cooling fluid pathways 70 between the stationary electrical coil 32 and the two case halves (4 and 33). These cooling fluid pathways 70 are intended to carry any suitable cooling fluid, such as air, water, coolant or oil across the outermost surface of the sealed stationary electrical coil 32. Preferably this cooling fluid will be circulated around the sealed stationary electrical coil 32 through the cooling fluid pathways 70 in opposite directions to provide a more even cooling around the entire outside diameter of the sealed stationary electrical coil 32. This is a very desirable feature especially during times of high energy output or continuous duty operation. The cooling fluid may also be circulated through other parts of the engine block 13 through the coolant holes 64 (FIG. 4). Additional cooling (see FIG. 5) of the combustion chambers 60, the pistons 16, the cylinders 14, the exhaust valves 20, the exhaust ports 62 and the exhaust gases exiting the exhaust pipe 26, may be related to the additional cooling effects offered by the Pressure Boost feature, which will be more fully described later in this text.

FIG. 7 and FIG. 7A are quite similar to FIG. 6 and FIG. 6A although for increased clarity regarding the operation of the Engine/Generator the outside cam-track. 45 and the inside cam-track 46, which are located in the unseen top portion of the cam-track/armature assembly 75, more specifically in the upper cam-track plate 9 are shown, though the upper-cam track plate 9 is not shown. The outside cam-track 45 and the inside cam-track 46 will be seen in all future views. It should be understood that during operation the cam-roller assemblies 18 are in constant and continuous contact with the outside cam-track 45 ensuring the constant, continuous rotational direction of the cam-roller assemblies 18 during operation. Clearance is provided between the cam-roller assemblies 18 and the inside cam track 46 to ensure that no contact is made during normal running operation. It should be noted that contact with the inside cam-track 46 by the cam roller assemblies 18 is only made for a brief period during start-up and shut-down of the Engine/Generator. In this view we can see that the lower main radial bearings 7 have been removed from the areas within the cylinders 14 for increased clarity as mentioned before.

Looking now to the operation of the stationary block Engine/Generator as seen in FIG. 7 and FIG. 7A, the position of the piston assembly 39 can be seen in the two opposing cylinders 14A. The piston assemblies 39 are located at the top of their stroke, the exhaust valve stems 21 are closed in the valve assemblies 20, fuel has been injected into the two combustion chambers 60 related to the cylinders 14A, a high-energy ignition spark is jumped from the spark plugs 3 within the combustion chambers 60. As the rotational direction of the cam-track/armature assembly 75 in the preferred embodiment is clockwise the pressure exerted on the piston assembly 39 by the combustion of fuel (and the expansion of water used in the Pressure Boost feature as will be more fully explained later) in the combustion chambers is translated to the cam-roller assemblies 18 which are in constant and continuous contact with the outside cam-track 45, and that this rotational movement of the cam-track/armature assembly 75 with the included outside cam-tracks 45 and the inside cam-tracks 46 will bring the two angular descending surfaces 45A into contact with the pressurized cam-roller assemblies 18 causing rotation of the cam-track/armature assembly 75 and further causing the production of electricity through the interaction of the magnets in the cam-track/armature assembly 75 and the stationary electrical coil 32.

FIG. 8 and FIG. 8A are quite similar to FIGS. 7 and 7A except that in these views the cam-track/armature assembly 75, with the included cam-tracks 45 and 46, has been rotated in a clockwise direction (a total of 33.1° (FIG. 3C) from FIGS. 7 and 7A) as a direct result of the combustion event seen in FIGS. 7 and 7A. The piston assemblies 39 are now at the bottom of their stroke and the exhaust valve stems 21 are fully opened as a result of the interaction of the exhaust valve cam 25, of the exhaust valve assemblies 20, with the raised cam-lands 47, of the exhaust valve actuating cam-ring 30. The combustion event is now complete and compressed exhaust gases are allowed to leave the cylinders 14A through the opened exhaust valve stems 21 and out the exhaust pipe 26 by way of the exhaust ports 62 in the stationary engine block 13. As there is no movement of the piston assemblies 39 at this time there is no combustion energy lost during the exhaust cycle of the Stationary Block Engine/Generator, as in conventional engines where the piston immediately moves back inward, back to the top of the piston stroke, forcing exhaust gases out of the cylinders at great pressure, consequently causing great inefficiency and a loss of usable energy.

The next event in the operation of the Stationary Block Engine/Generator is the cylinder purge and cooling cycle, which is again accomplished with relatively no movement of the piston assemblies 39 greatly increasing the amount of usable energy produced during the combustion event. Once the cylinders 49A are decompressed because of the open exhaust valve stems 21, cylinder purge and cooling air is allowed to enter the cylinders under pressure by way of the threaded port 57 in the top case half 4 to the relief groove 58 that surrounds the cylinders 14A, and is directed into the cylinders through the air intake port 71 (FIG. 8A) which is located through the outside diameter wall of the cylinders 14A and into the cylinders at the air purge/cooling/pre-compression port 72 (FIG. 8A) which is located through the inside diameter wall of the cylinders 14A and is now fully exposed to the internal cylinder by the fully extended position of the piston assembly 39. It is here that we can best see the functional reason for the improved extended piston aprons 16A as seen in FIGS. 1A & 1B. The only time that air from the air purge/cooling/pre-compression port 72 is allowed to flow within the inside diameter of the cylinder 14 is when the piston assembly 39 is in its fully extended outward position (farthest from the combustion chamber), at all other times the piston 16 with its extended apron 16A will cover the air purge/cooling/pre-compression ports 72 blocking the flow of air. This action eliminates the need for a complicated internal valving system or an external ancillary valve system to start and stop the flow of air through the threaded port 57 and ultimately out the air ports 72. When the ports 72 are exposed to the cylinders the purge and cooling air circulates through the entire length of the cylinders and combustion chambers escaping through the still open exhaust valve stems 21, cooling the cylinders, combustion chambers, exhaust valves, the exhaust valve assemblies, the stationary block and the exhaust pipe. This process ensures that spent gases within the cylinders and combustion chambers from the previous combustion are more fully removed prior to the next combustion, improving the next combustions efficiency, increasing combustion energy and reducing pollution while increasing overall efficiency and usable energy production. Because the entire usable length of the cylinders 14 are cooled internally, there internal surface temperatures are lower when the new fresh combustion air is finally introduced into the cylinder. Because the internal surface temperatures of the cylinders are cooler, there is less pre-expansion of the air in the cylinder prior to the next combustion event, allowing greater expansion of those gases during and after the combustion event. This means greater energy production from the combustion event as a result of greater expansion of the gasses within the cylinders after combustion has been initiated, which in turn produces higher cylinder pressures which are then exerted on the piston assembly 39 thereby producing more power per combustion event and more usable output energy, and therefore greater overall efficiency and lower fuel consumption.

This purge and cooling event is not effectively possible in a conventional engine because there is no substantial amount of time at which the reciprocating pistons are in a fully extended, relatively stationary position. With the present invention, because the pistons may remain at or near a fully extended position following each combustion event for a much longer predetermined amount of time, it provides an opportunity for air to be introduced into the cylinders through the air purge ports at one end of the cylinder and subsequently expel that air from the other end of the cylinder through the open exhaust valve so as to more effectively evacuate spent gases while cooling the cylinders.

FIG. 9 and FIG. 9A are quite similar to FIGS. 8 and 8A except that in these views the cam-track/armature assembly 75, with the included cam tracks 45 and 46, have been rotated still farther in a clockwise direction (a total of 90° from FIGS. 7 and 7), as a direct result of the combustion event seen in FIGS. 7 and 7A. At this point the cylinder purge and cooling cycle is still in progress. Before the cylinder purge and cooling cycle has been completed the entire volume of air in the cylinders 14A will have been replaced several times ensuring a cool and clean environment to maximize the next combustion event. The exhaust valve stems 21 are still open in these views, they will remain open until shortly before the next compression cycle when the piston assembly 39 begins to move slowly inward due to the interaction of the cam roller assemblies 18 and the gradually increasing cam ring angle of the outer cam-track 45 as seen at 45B. This slower acceleration of the piston assembly will again conserve energy which can be converted directly into usable output energy by the generator portion of the Engine/Generator assembly, further increasing overall efficiency.

In FIGS. 9 and 9A, the cylinders 14B are now in the same ignition position that the cylinders 14A were in in FIGS. 7 and 7A. The cylinders 14A of FIGS. 9 and 9A are still in the purge and cooling cycle with the exhaust valve stems 21 still open. The exhaust valve stems 21 will remain open for another 25.6° of clockwise rotation of the cam-track/armature assembly 75 and the cylinder purge and cooling cycle will continue for another 36.6° of clockwise rotation of the cam-track/armature assembly 75. In this preferred embodiment the exhaust valve stem 21 closes 11° prior to the end of the purge/cooling cycle. This configuration therefore allows the cylinders to be pre-pressurized by the purge/cooling air which is still entering the cylinder 14 prior to the inward movement of the piston assembly 39 which is caused by the interaction of the cam roller assemblies 18 and the outer cam-track 45. This action will provide for greater cylinder pressures prior to combustion. If it is determined that higher or lower cylinder pressures are desirable prior to combustion, the timing of the valve stem 21's closure can be simply adjusted to occur at any time before or after the purge/cooling cycle is complete, thereby increasing, reducing or eliminating pre-compression cylinder pressure. The valve stem closure can be further delayed so as not to occur until after partial ascent of the piston assembly 39 on the outer cam-track 45 during the compression cycle, further reducing internal cylinder pressures prior to combustion if so desired.

As noted above, the cylinders 14B are now in the same ignition position as the cylinders 14A were in, in FIGS. 7 and 7A. The cam-track/armature assembly 75 of the Stationary Block Engine/Generator has only rotated 90° since the last combustion event where the two opposing cylinders 14A and their combustion chambers experienced combustion events. It should also be clear that each cylinder has a combustion event once in the course of each 180° rotation and therefore twice in the course of one complete 360° rotation. The four-cylinder Stationary Block Engine/Generator as shown will therefore produce 8 complete combustion events in the course of one 360° rotation. In comparison, a conventional four-cylinder engine produces only 2 complete combustion events in the course of one 360° rotation. Therefore the four-cylinder Stationary Block Engine/Generator as shown in this description will produce 4 times the number of combustion events per revolution.

FIG. 10 is a full cross-sectional side view taken substantially along section line 8A-8A of the FIG. 8, but assembled and shown with the inclusion of the removed top case 4 and all the associated parts therein of FIG. 8 to illustrate the assembled arrangement of all the parts therein. FIG. 10 also shows a section window, Section 10A, which is used as the baseline for the following enlarged section views of FIGS. 11, 12, 13, 14, 15, 16, 17, 18 and 19.

FIG. 11 is the first of a series of enlarged cross sectional side views provided to clearly outline and defined the series of events and features associated with the Pressure Boost feature of the preferred embodiment of this invention. FIG. 11 is titled, Position A in reference to the letter A shown in FIG. 3C, which represents the bottom of the piston stroke or the farthest point from the combustion chamber that the piston assembly 39 will attain. We can clearly see in FIG. 11 that the piston assembly 39 is at the bottom of its stroke. Purge/cooling air is being introduced into the area within the cylinder 14 through the purge air port 57 in the upper case 4 and into a relief groove 58 that surrounds the cylinder 14, and is therefore in communication with the cast port 71, which extends through the outside diameter wall of the cylinder 14 where the purge/cooling air continues into the cylinder via the cast channel 71A oriented between the inner and the outer walls of the cylinder 14, and exiting into the area within the cylinder 14 at the cast port 72, which extends through the inside diameter wall of cylinder 14. Once within the cylinder walls the purge/cooling air continues to circulate around the cylinder walls providing cooling while forcing spent gases and steam from the previous combustion to exit through the open exhaust valve stem 21, of the valve assembly 20, through the exhaust bores 62 and out of the threaded exhaust pipe 26. For the sake of clarity the cast port 71 and the cast channel 71A within the cylinder wall, will not be seen in any future drawings except in FIG. 19.

FIG. 12 is titled, Position B in reference to the letter B shown in FIG. 3C, which represents that point at which the exhaust valve stem 21, of the valve assembly 20, is fully closed. At this point pre-compression (#5 of FIG. 3C) has started. Air continues to flow through port 57 and ultimately into the area within the cylinder 14 through the cast port 72 (as described above) pre-pressurizing the cylinder 14 and the combustion chamber 60 until such time as the piston assembly 39, which is slowly moving inwards/upwards towards the combustion chamber 60, completely covers the cast port 72 blocking the flow of air.

FIG. 13 is titled, Position C in reference to the letter C shown in FIG. 3C, which represents a point in time after the completion of the pre-compression feature (see #6 of FIG. 3C) when the inward/upward moving piston assembly 39 has completely sealed the cylinder by covering the cast port 72 within the cylinder 14. At this point any liquid or gaseous spark ignited fuel can be injected into the area within the cylinder 14 using a typical, readily available, low-pressure fuel injection system (not shown). This early injection of fuel may be desirable as it allows more time for the injected fuel to be more evenly dispersed in the air contained within the cylinder. In the preferred embodiment of this invention natural gas is the preferred fuel of choice. Natural gas 90 can be seen entering the dual fuel/water injector 2 and ultimately injected into the area within the cylinder 14.

FIG. 14 is titled, Position D in reference to the letter D shown in FIG. 3C, which represents any point after the low-pressure injection of natural gas (or any other suitable liquid or gaseous—spark ignited fuel) has been injected into the area within the cylinder 14 and is being compressed (see #6 & 7 of FIG. 3C) by the ongoing action of the inward/upward moving piston assembly 39.

FIG. 15 is titled, Position F in reference to the letter E shown in FIG. 3C, which represents that point when the piston assembly 39 has reached the very top or end of its inward stroke. Immediately upon reaching the top or end of the piston stroke the spark plug 3 is energized to produce a spark within the combustion chamber 60 causing combustion 91 of the air/fuel mixture within the combustion chamber 60.

The piston assembly 39, is now held in a stationary position (along surface E1 see #9 FIG. 3C) until such time as all or part of the combustion of the air/fuel mixture within the cylinder is completed as determined by the specific characteristics of the specific fuel being used.

This feature is of great importance as typical crankshaft engines cannot stop the motion of the piston and are therefore required to initiate combustion of the air/fuel mixture while the piston is still moving upwardly during the compression cycle. This action is required in conventional engines due to the high operating speed of the pistons and the amount of time required to achieve complete combustion of the air/fuel mixture. The result of this required early ignition in conventional engines includes a loss of output power as the piston has to overcome the added pressure of the early combustion event while still moving upwardly towards top dead center (TDC) as determined by the position of the crankshaft, (this condition causes negative rotational forces). Negative rotational forces rob overall efficiency and cause an increase in fuel consumption to overcome the inherent energy losses. This condition is further compounded in conventional engines as the ignition event is typically started even earlier as the speed of the engine increases. The relatively fixed speed engine of the preferred embodiment of this invention eliminates the aforementioned problems completely as the piston assembly 39 is allowed to reach its uppermost position within the cylinder at the time of ignition and the piston assembly 39 is further allowed to remain stationary (see #9 of FIG. 3C) at the uppermost position within the cylinder for whatever period of time is required by whatever specific fuel is being used so as to ensure the complete combustion of the air/fuel mixture during the combustion event, and the optimization of the output power produced by the combustion event.

It should be noted that the above descriptions related to FIGS. 13 and 15 are specific to spark ignited fuels, such as gasoline, propane or natural gas which is the fuel of choice of the preferred embodiment. In the case of pressure ignited fuels (such as diesel, JP-8, etc.) the fuel will not be injected into the cylinder at position C as shown in FIG. 13 but rather at position E as shown in FIG. 15. With the exception of the early, low-pressure injection capability cited in FIG. 13, all of the benefits described above continue to apply with the use of any/all pressure ignited fuels.

FIG. 16 is titled, Position F in reference to the letter F shown in FIG. 3C, which represents the transitional area where the piston assembly 39 starts moving outwardly as a result of the pressure exerted on the piston assembly 39 by the combustion of fuel in the combustion chambers, which is translated to the cam-roller assemblies 18 that are in constant and continuous contact with the outside, angular descending, surfaces of the cam-track 45, causing rotation of the cam-track/armature assembly 75 and further causing the production of electricity through the interaction of the magnets 11 in the rotating cam-track/armature assembly 75, and the stationary electrical coil 32 secured to the outer case halves.

Referring now to FIG. 3C, it is at this transitional period after the dwell signified by the number 9 in FIG. 3C, that we are first introduced to the Pressure Boost feature of the present invention. Regarding the dwell at number 9, it should be clearly understood that although the duration of the dwell 9 is fixed, it is predetermined by the combustion characteristics of the specific fuel being used. The length of the dwell used for diesel fuel may not be the same as the length of the dwell allotted for the use of gasoline, or natural gas etc. Referring again to FIG. 3C, and more particularly to our current view at the letter F, we can see that the piston assembly 39, which was held in a stationary position (along surface E1) until such time as all or part of the combustion of the air/fuel mixture within the cylinder was completed, has now started to accelerate outwardly as the cam-roller assemblies 18 follow the descending radius of the outer cam-track 45 as is clearly seen at the letter F. Although the Engine/Generator of the present invention is intended for relatively fixed speed operation, the acceleration rate of the piston can be easily adjusted to best suit the particular fuel being used by simply adjusting the size of the radius shown at the letter F. The larger the transitional radius is between, surface E1 and the declining angular cam-track surface G, the slower the rate of acceleration of the piston assembly 39.

Referring back to FIG. 16 we can see that the spark plug 3 is no longer energized, the combustion of the natural gas/air fuel mixture 91 within the combustion chamber may or may not be complete at this time, water 92 is entering the combustion chamber 60 through the dual medium fuel/water injector 2. As one of the primary functions of the Pressure Boost feature, is to reduce or eliminate the production of NOx gases, and as thermal NOx gases are typically formed at temperatures in excess of 1,200° C. (approx. 2,200° F.), which are easily achievable during a natural gas combustion event, the Pressure Boost feature of the preferred embodiment of the present invention may be initiated at any time during or after the combustion event so as to limit the temperature of the combustion gasses within the cylinder and to maintain a temperature below that required for the production of NOx gases throughout the combustion cycle. The injection of water 92 into the combustion chambers 60 through the dual medium fuel/water injectors 2 during the combustion events may be accomplished by a single short burst, multiple short bursts or a controlled stream of water supplied to the combustion chamber 60 through the dual medium fuel/water injector 2. Another primary function of the Pressure Boost feature is to increase the pressure applied to the piston assembly 39 so as to extract more energy from the combustion process. As the water 92 is injected into the extremely hot combustion chamber, it is immediately converted into superheated or dry steam, which requires a much greater volume within the cylinder, which in turn substantially increases the pressure within the cylinder and therefore increases the harvestable output power of the complete Stationary Block Rotary Engine/Generator unit.

FIG. 17 is titled, Position G in reference to the letter G shown in FIG. 3C, which represents the angular descending, surfaces of the outer cam-track 45. It is clear by the steep angle of the outer cam-track 45 (seen at the designated letter G in FIG. 3C), that the outward movement of the piston assembly 39 will apply strong rotational forces to the cam-track/armature assembly 75. Looking now at FIG. 17 the outward movement of the piston assembly 39 and the interaction of the cam-roller assembly 18 on the outer cam-track surface 45 is evident. At this point the combustion of the air/natural gas fuel mixture within the cylinder may be complete, and additional water 92 may still be conveyed into the hot combustion chamber/cylinder through the dual medium fuel/water injector 2. As it is yet another stated goal of the Pressure Boost feature of the present invention to provide an extended piston stroke length in order to more completely utilize the heat of combustion while providing a means by which more work can be accomplished, and as the temperature within the combustion chamber/cylinder may still be hot enough to convert the water 92 into still more superheated or dry steam the Pressure Boost process may still continue.

Another stated goal of the Pressure Boost feature of the present invention is to reduce or eliminate the need for a separate, ancillary cooling system. As the conversion of water into superheated or dry steam is a cooling process, and as the production of this steam provides increased cylinder pressure, an extended piston stroke length, and more usable output power, it is intended that this process will continue through the combustion cycle until it is no longer practical or advantageous. Because the Pressure Boost feature is completely independent of the operation of the Stationary Block Rotary Engine/Generator its use can be maximized so as to further reduce the amount of fuel consumed to satisfy the current load requirements of the Engine/Generator unit.

The Pressure Boost feature as described in the text above is part of an independent Pressure Boost system which includes a computer processor and all necessary sensors required to monitor, the core temperature of the engine block 13, as well as the temperature of the exhaust gases exiting the exhaust pipe 26. Based on that information (and more) as well as information regarding the current load imposed on the Engine/Generator, the computer processor will determine the most appropriate amount of fuel to be injected into the cylinders prior to combustion, and establish the timing, frequency, and volume of water to be injected into the cylinders during and after the combustion event to ensure maximum fuel efficiency throughout the ever-changing variations related to load and thermal variations. For example, during cold startup it may be the case that additional fuel may be supplied to the cylinders and no water or only small amounts of water will be injected into the combustion chambers during the combustion event exclusively. However, as the core temperature of the Engine/Generator increases it may be beneficial to decrease the amount of fuel injected into the combustion chambers, while increasing the volume of the water injected into the combustion chambers as well as the frequency of the injections extending even after the completion of the combustion event. During times of maximum load, especially during continuous duty operation, it may be beneficial to again increase the amount of fuel injected into the combustion chambers, while maximizing the volume and frequency of the water injections into the combustion chamber/cylinders throughout the entire combustion cycle in order to maximize energy production while providing a suitable amount of internal cooling as would be required to ensure a long dependable service life. Mechanical injector pumps may be driven by the ring gear 5 (of FIG. 5) and typical electronically controlled unit injectors may be used in conjunction with the computer processor.

Water used in this Pressure Boost process may be reclaimed from the exhaust gases by means of a standard condenser after exiting the Engine/Generator, it will then be filtered and or treated if necessary and reused as long as is practical.

FIG. 18 is titled, Position H in reference to the letter H shown in FIG. 3C, which represents the outermost point that the outgoing piston assembly 39 can attain before exposing the cast port 72 (which can be seen in FIG. 19). Just prior to the piston assembly 39 reaching the point shown in FIG. 18 the exhaust valve stem 21 of the valve assembly 20 opens allowing all the pressurized combustion gases and steam to escape through the exhaust bores 62 and finally out the exhaust pipe 26. With the opening of the exhaust valve 21 the power producing portion of the combustion stroke (see FIG. 3C) is complete.

FIG. 19 is titled, Position I in reference to the letter I shown in FIG. 3C, which represents the bottom or outermost position the piston assembly 39 can attain. All features and actions that were described in reference to FIG. 11 are identical in the current view of FIG. 19. It can be clearly seen in FIG. 3C that position A (FIG. 11) is 180° from position I (FIG. 19), therefore it should be understood that the sequence of events as described above will simply be repeated over and over.

While the preceding preferred embodiments are described and depicted to show each of the cylinders 14 extending radially outward from the center, it is possible to configure the cylinders in many different ways.

FIGS. 20 and 21 are a top cross-sectional views showing other variations of the cylinder arrangement. Reference numerals have been omitted for clarity, but the elements in each FIG. may be readily identified by any of the preceding FIGS. 6, 7, 8 and 9. FIGS. 20 and 21 each show an embodiment in which the orientation of the cylinders has been offset slightly, either to the left or right, extending directly radially outward from the center.

FIGS. 22 and 23 each depict a top cross-sectional view in which the cylinder arrangement is even further offset to extended 90° from a radially outward direction from the center. As can be seen in these figures, such an offset arrangement results in an even more compact design which may be desirable for certain applications. The offset cylinder configuration while being more compact will however increase the loads placed on components of the engine during operation.

It will be recognized that the foregoing explanation associated with FIGS. 1-9A have followed the events occurring in one quarter (90 degrees) of one revolution of the cam-track/armature assembly 75 of the Stationary Block Rotary Engine/Generator. It will be further recognized that the foregoing explanation associated with FIGS. 11-. 19 have followed the events occurring in one half (180 degrees) of one revolution of the cam-track/armature assembly 75 of the Stationary Block Rotary Engine/Generator with Pressure Boost. It is to be recognized by one familiar with the interior workings of a typical engine that the herein disclosed engine and generator combination of the Stationary Block. Rotary Engine/Generator represents a great leap forward in the search. for an extremely power dense, lightweight, economical, dependable and reliable source of electrical power, contained in an extremely small package, that is useful for virtually any and all portable, as well as stationary power generation applications. It is to be further recognized that the addition of the Pressure Boost feature further enhances all of the above mentioned benefits. It is also to be recognized that the herein disclosed engine with the included Pressure Boost feature, of the Stationary Block Rotary Engine/Generator with Pressure Boost is capable of operating using any single fuel our combination of liquid and/or gaseous fuels, whether spark or pressure ignited, commonly used in the operation of internal combustion engines. It is to be still further recognized that the use of the Pressure Boost feature of the Stationary Block Rotary Engine/Generator with Pressure Boost will provide increased output power, while reducing or eliminating the production of NOx gases during the combustion process, and while greatly reducing the temperature of the exhaust gases, thereby causing a substantial reduction of both toxic gaseous pollution as well as a substantial reduction of thermal pollution emitted into the atmosphere. It should be further recognized that, due to the increased power density and overall efficiency provided by the novel Pressure Boost feature, the herein disclosed engine of the Stationary Block Rotary Engine/Generator with Pressure Boost is capable of producing more usable output energy, while consuming substantially reduced amounts of fuel.

Having described this invention, it is believed that from the foregoing those skilled in the art will readily recognize and appreciate the novel advancement represented by this invention and will understand that the embodiment hereinabove described and illustrated in the accompanying drawings, while being preferred, is susceptible to modification, variation and substitution of equivalents without departing from the spirit and scope of the invention, which is intended to be unlimited by the foregoing, except as may appear in the following appended claims.

What is claimed is:

1. A method of improving the performance and efficiency of an internal combustion engine during its compression and power strokes, comprising the steps of:
   providing at least one cylinder with a piston movable coaxially within said cylinder;
   moving said piston within said cylinder in said compression stroke;
   dwelling said piston at a predetermined position near top dead center;
   increasing the pressure within said cylinder by combusting an air and fuel mixture;
   introducing a rapidly expanding medium comprising liquid water into said cylinder during combustion, whereby said medium transforms into an increased-volume gas during combustion to further increase the pressure within said cylinder, reduce the temperature within said cylinder, and provide additional power for said power stroke; and
   releasing the position of said piston based upon at least one parameter, whereby said piston initiates said power stroke.

2. The method of claim 1, wherein said piston is dwelled at a position after top dead center to eliminate negative rotational forces associated with early ignition.

3. The method of claim 1, wherein said piston is dwelled using an endless cam track structure.

4. The method of claim 1, wherein the acceleration and deceleration values of said piston are independently controlled to increase energy production.

5. The method of claim 4, wherein said acceleration and deceleration values of said piston are predetermined based upon fuel type.

6. The method of claim 1, wherein said piston initiates said power stroke before the complete combustion of said air and fuel mixture.

7. The method of claim 1, wherein said rapidly expanding medium is introduced before, during, or after the complete combustion of said air and fuel mixture.

8. The method of claim 1, wherein the timing of said introduction of said rapidly expanding medium is based upon at least one parameter.

9. The method of claim 1, wherein the length of said power stroke is extended.

10. The method of claim 1, wherein said temperature within said cylinder is reduced to eliminate the production of NOx.

11. The method of claim 1, wherein said rapidly expanding medium is introduced into said cylinder in multiple bursts.

12. The method of claim 11, wherein at least a portion of said bursts are introduced after the releasing of said piston.

13. An improved internal combustion engine having compression and power strokes, comprising:
   at least one cylinder;
   a piston movable coaxially within said cylinder, said piston having at least one cam follower;
   an endless cam track driven by said at least one cam follower, said cam track being configured to permit the independent movement and acceleration of said piston during said compression and power strokes based upon at least one parameter;
   means for introducing air and fuel into said cylinder and compressing said air and fuel during said compression stroke;
   means for combusting said air and fuel to initiate said power stroke, whereby the combustion of said air and fuel serves to drive said piston and said cam follower; and
   means for introducing a rapidly expanding medium comprising liquid water into said cylinder during said combustion, whereby said medium transforms into an increased-volume gas to increase the pressure within said cylinder, reduce the temperature within said cylinder, and further drive said piston.

14. The improved engine of claim 13, wherein said cam track permits the independent movement and acceleration of said piston with at least one dwell.

15. The improved engine of claim 14, wherein said at least one dwell fixes the location of said piston near top dead center for at least a portion of said combustion.

16. The improved engine of claim 14, wherein said at least one dwell controls the time between the movement and acceleration of said piston.

* * * * *